US010325232B2

(12) United States Patent
Santiago, III et al.

(10) Patent No.: US 10,325,232 B2
(45) Date of Patent: Jun. 18, 2019

(54) ALLOCATING HERITAGE INFORMATION IN DATA MODELS

(71) Applicant: Apptio, Inc., Bellevue, WA (US)

(72) Inventors: Michael Santiago, III, Issaquah, WA (US); Supin Ko, Seattle, WA (US); Justin Alexander Friedl, Issaquah, WA (US); Tavis Dean Elliott, Bothell, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/033,130

(22) Filed: Sep. 20, 2013

(65) Prior Publication Data
US 2015/0088584 A1    Mar. 26, 2015

(51) Int. Cl.
G06Q 10/00    (2012.01)
G06Q 10/06    (2012.01)

(52) U.S. Cl.
CPC .................. G06Q 10/06315 (2013.01)

(58) Field of Classification Search
CPC ........................................ G06Q 10/00–50/00
USPC .................................. 705/7.11–7.42
See application file for complete search history.

(56) References Cited

U.S. PATENT DOCUMENTS

| 4,744,026 A * | 5/1988 | Vanderbei ............ G06Q 10/06 705/7.22 |
| 5,249,120 A * | 9/1993 | Foley ................... G06Q 10/06 705/1.1 |
| 5,615,121 A | 3/1997 | Babayev et al. |
| 5,721,919 A * | 2/1998 | Morel ............... G06F 17/30607 |
| 5,758,327 A | 5/1998 | Gardner et al. |
| 5,799,286 A * | 8/1998 | Morgan ............ G06Q 10/0631 705/30 |
| 5,802,508 A * | 9/1998 | Morgenstern ........ G06N 5/027 706/55 |
| 5,903,453 A | 5/1999 | Stoddard, II |
| 5,970,476 A | 10/1999 | Fahey |
| 5,991,741 A | 11/1999 | Speakman et al. |
| 6,014,640 A * | 1/2000 | Bent ............................ 705/30 |

(Continued)

FOREIGN PATENT DOCUMENTS

JP    2011134268 A    7/2011

OTHER PUBLICATIONS

US 5,649,211 A, 04/1997, Horkin et al. (withdrawn)

(Continued)

*Primary Examiner* — Alan S Miller
(74) *Attorney, Agent, or Firm* — John W. Branch; Lowe Graham Jones PLLC

(57) ABSTRACT

Various embodiments are directed towards including heritage information when allocating costs for a plurality of cost objects. A target object, a source object and heritage objects may be determined from a data model. At least one line item in the source object may be generated by allocating costs from the heritage objects with the generated source object line items corresponding to a line item from a heritage object. At least one line item in the target object may be generated based on allocating costs from the source object. And, at least one generated target object line item may be based on at least one source object line item and its corresponding heritage object line item. A final cost value for the target object may be generated based on a sum of each target object line item and displayed in the data model.

30 Claims, 10 Drawing Sheets

(56) References Cited

U.S. PATENT DOCUMENTS

| | | | |
|---|---|---|---|
| 6,032,123 A * | 2/2000 | Jameson | G06Q 10/04 705/7.22 |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 * | 6/2001 | Corlett | G06Q 40/00 705/35 |
| 6,308,166 B1 | 10/2001 | Breuker et al. | |
| 6,321,207 B1 | 11/2001 | Ye | |
| 6,330,552 B1 | 12/2001 | Farrar | |
| 6,424,969 B1 | 7/2002 | Gruenwald | |
| 6,507,825 B2 | 1/2003 | Suh | |
| 6,578,005 B1 * | 6/2003 | Lesaint et al. | 705/7.14 |
| 6,594,672 B1 | 7/2003 | Lampson et al. | |
| 6,647,370 B1 | 11/2003 | Fu et al. | |
| 6,738,736 B1 | 5/2004 | Bond | |
| 6,789,252 B1 * | 9/2004 | Burke | G06F 8/10 717/100 |
| 6,832,212 B1 * | 12/2004 | Zenner | G06Q 20/102 705/40 |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1 | 11/2005 | Jameson | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 * | 12/2006 | Munoz | G06Q 10/06 705/2 |
| 7,177,850 B2 | 2/2007 | Argenton et al. | |
| 7,263,527 B1 | 8/2007 | Malcom | |
| 7,305,491 B2 | 12/2007 | Miller et al. | |
| 7,308,427 B1 | 12/2007 | Hood | |
| 7,321,869 B1 | 1/2008 | Phibbs, Jr. | |
| 7,386,535 B1 | 6/2008 | Kalucha et al. | |
| 7,418,438 B2 | 8/2008 | Gould et al. | |
| 7,505,888 B2 | 3/2009 | Legault et al. | |
| 7,590,937 B2 * | 9/2009 | Jacobus | G06Q 40/06 345/501 |
| 7,634,431 B2 * | 12/2009 | Stratton | 705/30 |
| 7,653,449 B2 | 1/2010 | Hunter et al. | |
| 7,664,729 B2 | 2/2010 | Klein et al. | |
| 7,703,003 B2 | 4/2010 | Payne et al. | |
| 7,725,343 B2 * | 5/2010 | Johanson | G06Q 10/06375 705/7.37 |
| 7,742,961 B2 | 6/2010 | Aaron et al. | |
| 7,752,077 B2 | 7/2010 | Holden et al. | |
| 7,761,548 B2 | 7/2010 | Snyder et al. | |
| 7,769,654 B1 | 8/2010 | Hurewitz | |
| 7,774,458 B2 | 8/2010 | Trinon et al. | |
| 7,783,759 B2 | 8/2010 | Eilam et al. | |
| 7,801,755 B2 | 9/2010 | Doherty et al. | |
| 7,805,400 B2 | 9/2010 | Teh et al. | |
| 7,813,948 B2 * | 10/2010 | Ratzloff | G06Q 10/00 705/7.22 |
| 7,852,711 B1 | 12/2010 | Fitzgerald et al. | |
| 7,870,051 B1 | 1/2011 | En et al. | |
| 7,899,235 B1 | 3/2011 | Williams et al. | |
| 7,917,555 B2 | 3/2011 | Gottumukkala et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 * | 6/2011 | Capelli et al. | 705/35 |
| 7,966,266 B2 | 6/2011 | Delvat | |
| 8,010,584 B1 | 8/2011 | Craver et al. | |
| 8,024,241 B2 * | 9/2011 | Bailey et al. | 705/35 |
| 8,073,724 B2 | 12/2011 | Harthcryde et al. | |
| 8,121,959 B2 | 2/2012 | Delvat | |
| 8,175,863 B1 | 5/2012 | Ostermeyer et al. | |
| 8,195,524 B2 | 6/2012 | Sandholm et al. | |
| 8,195,785 B2 | 6/2012 | Snyder et al. | |
| 8,200,518 B2 * | 6/2012 | Bailey | G06Q 10/063 705/7.11 |
| 8,200,561 B1 | 6/2012 | Scott et al. | |
| 8,209,218 B1 | 6/2012 | Basu et al. | |
| 8,214,829 B2 | 7/2012 | Neogi et al. | |
| 8,260,959 B2 | 9/2012 | Rudkin et al. | |
| 8,370,243 B1 | 2/2013 | Cernyar | |
| 8,396,775 B1 | 3/2013 | Mindlin | |
| 8,423,428 B2 * | 4/2013 | Grendel | G06Q 30/0635 705/26.81 |
| 8,484,355 B1 | 7/2013 | Lochhead et al. | |
| 8,533,904 B2 | 9/2013 | Conrad | |
| 8,543,438 B1 | 9/2013 | Fleiss | |
| 8,600,830 B2 | 12/2013 | Hoffberg | |
| 8,601,263 B1 | 12/2013 | Shankar et al. | |
| 8,606,827 B2 | 12/2013 | Williamson | |
| 8,655,714 B2 | 2/2014 | Weir et al. | |
| 8,667,385 B1 | 3/2014 | Mui et al. | |
| 8,766,981 B2 | 7/2014 | McLachlan et al. | |
| 8,768,976 B2 | 7/2014 | McLachlan et al. | |
| 8,826,230 B1 | 8/2014 | Michelsen | |
| 8,935,301 B2 | 1/2015 | Chmiel et al. | |
| 8,937,618 B2 | 1/2015 | Erez et al. | |
| 8,970,476 B2 | 3/2015 | Chan | |
| 8,996,552 B2 | 3/2015 | Mukes et al. | |
| 9,015,692 B1 | 4/2015 | Clavel | |
| 9,020,830 B2 | 4/2015 | Purpus et al. | |
| 9,104,661 B1 | 8/2015 | Evans | |
| 9,213,573 B2 | 12/2015 | French et al. | |
| 9,281,012 B2 | 3/2016 | Hedges | |
| 9,384,511 B1 | 7/2016 | Purpus | |
| 9,529,863 B1 | 12/2016 | Gindin et al. | |
| 9,805,311 B1 | 10/2017 | Mohler | |
| 2002/0002557 A1 * | 1/2002 | Straube | G06F 17/30575 |
| 2002/0016752 A1 * | 2/2002 | Suh | G06Q 40/12 705/30 |
| 2002/0056004 A1 * | 5/2002 | Smith | G06Q 40/04 709/227 |
| 2002/0069102 A1 | 6/2002 | Vellante et al. | |
| 2002/0082966 A1 | 6/2002 | O'Brien et al. | |
| 2002/0087441 A1 * | 7/2002 | Wagner, Jr. | G06Q 30/06 705/30 |
| 2002/0107914 A1 | 8/2002 | Charisius et al. | |
| 2002/0123945 A1 | 9/2002 | Booth et al. | |
| 2002/0145040 A1 * | 10/2002 | Grabski, III | G06Q 40/02 235/385 |
| 2002/0156710 A1 | 10/2002 | Ryder | |
| 2002/0174006 A1 * | 11/2002 | Rugge | G06Q 10/10 705/36 R |
| 2002/0174049 A1 | 11/2002 | Kitahara | |
| 2002/0178198 A1 | 11/2002 | Steele | |
| 2002/0194329 A1 | 12/2002 | Alling | |
| 2003/0019350 A1 | 1/2003 | Khosla | |
| 2003/0074269 A1 | 4/2003 | Viswanath | |
| 2003/0083388 A1 | 5/2003 | L'Alloret | |
| 2003/0083888 A1 * | 5/2003 | Argenton | G06Q 30/0283 705/400 |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 | 7/2003 | Nishikawa et al. | |
| 2003/0139986 A1 | 7/2003 | Roberts, Jr. | |
| 2003/0158766 A1 | 8/2003 | Mital et al. | |
| 2003/0172018 A1 | 9/2003 | Chen et al. | |
| 2003/0172368 A1 | 9/2003 | Alumbaugh et al. | |
| 2003/0195780 A1 | 10/2003 | Arora et al. | |
| 2003/0208493 A1 | 11/2003 | Hall et al. | |
| 2003/0217033 A1 | 11/2003 | Sandler et al. | |
| 2003/0233301 A1 | 12/2003 | Chen et al. | |
| 2003/0236721 A1 * | 12/2003 | Plumer et al. | 705/30 |
| 2004/0030628 A1 | 2/2004 | Takamoto et al. | |
| 2004/0039685 A1 | 2/2004 | Hambrecht et al. | |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1 | 5/2004 | Berger et al. | |
| 2004/0111509 A1 | 6/2004 | Eilam et al. | |
| 2004/0133876 A1 | 7/2004 | Sproule | |
| 2004/0138942 A1 | 7/2004 | Pearson et al. | |
| 2004/0186762 A1 | 9/2004 | Beaven et al. | |
| 2004/0243438 A1 | 12/2004 | Mintz | |
| 2004/0249737 A1 | 12/2004 | Tofte | |

(56) References Cited

U.S. PATENT DOCUMENTS

| | | |
|---|---|---|
| 2005/0004856 A1* | 1/2005 | Brose .................... G06Q 40/00 705/35 |
| 2005/0033631 A1 | 2/2005 | Wefers et al. |
| 2005/0038788 A1 | 2/2005 | Dettinger et al. |
| 2005/0044224 A1 | 2/2005 | Jun et al. |
| 2005/0060298 A1* | 3/2005 | Agapi .................. G06F 3/0482 |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0131870 A1 | 6/2005 | Krishnaswamy et al. |
| 2005/0131929 A1 | 6/2005 | Bailey |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1* | 11/2005 | Gabelmann .......... G06Q 10/087 711/111 |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1* | 4/2006 | Zhang .................... G06Q 30/02 705/400 |
| 2006/0085302 A1 | 4/2006 | Weiss et al. |
| 2006/0085465 A1 | 4/2006 | Nori et al. |
| 2006/0106658 A1* | 5/2006 | Johanson ............... G06Q 10/06 705/7.37 |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1* | 7/2006 | Yakov ............................... 705/1 |
| 2006/0178960 A1* | 8/2006 | Lepman ................. G06Q 10/00 705/30 |
| 2006/0179012 A1* | 8/2006 | Jacobs ................... G06Q 10/04 705/400 |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1* | 5/2007 | Mekyska ............... G06Q 10/06 705/30 |
| 2007/0129892 A1 | 6/2007 | Smartt et al. |
| 2007/0179975 A1 | 8/2007 | Teh et al. |
| 2007/0198317 A1 | 8/2007 | Harthcryde et al. |
| 2007/0198982 A1* | 8/2007 | Bolan et al. .................... 718/104 |
| 2007/0214413 A1* | 9/2007 | Boeckenhauer ...... G06F 9/5027 715/700 |
| 2007/0226064 A1 | 9/2007 | Yu et al. |
| 2007/0226090 A1* | 9/2007 | Stratton ................. G06Q 10/00 705/30 |
| 2007/0233439 A1 | 10/2007 | Carroll et al. |
| 2007/0260532 A1 | 11/2007 | Blake, III |
| 2007/0265896 A1 | 11/2007 | Smith |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1* | 3/2008 | Ratzloff ................. G06Q 10/00 705/7.37 |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1* | 8/2009 | Laithwaite ........... G06Q 10/109 718/104 |
| 2009/0210275 A1 | 8/2009 | Andreev et al. |
| 2009/0216580 A1* | 8/2009 | Bailey .................. G06Q 10/063 705/7.27 |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1* | 2/2010 | Liu ..................... G06Q 10/0631 705/7.12 |
| 2010/0049494 A1 | 2/2010 | Radibratovic et al. |
| 2010/0082380 A1 | 4/2010 | Merrifield, Jr. et al. |
| 2010/0094740 A1* | 4/2010 | Richter ................. G06Q 40/02 705/35 |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1* | 9/2010 | Ariff ..................... G06Q 40/00 705/35 |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066628 A1 | 3/2011 | Scheider |
| 2011/0066628 A1 | 3/2011 | Jayaraman |
| 2011/0072340 A1 | 3/2011 | Miller |
| 2011/0106691 A1* | 5/2011 | Clark ................... G06Q 40/025 705/38 |
| 2011/0107254 A1 | 5/2011 | Moroze |
| 2011/0167034 A1* | 7/2011 | Knight ............... G06F 17/30312 707/602 |

(56) References Cited

U.S. PATENT DOCUMENTS

| | | |
|---|---|---|
| 2011/0196795 A1 | 8/2011 | Pointer |
| 2011/0225277 A1 | 9/2011 | Freimuth et al. |
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1* | 7/2012 | Schloter .............. G06Q 40/12 705/30 |
| 2012/0232947 A1 | 9/2012 | McLachlan |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0028537 A1 | 1/2013 | Miyake et al. |
| 2013/0041819 A1* | 2/2013 | Khasho .............. G06Q 40/02 705/42 |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103369 A1 | 4/2013 | Huynh et al. |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |
| 2013/0173159 A1 | 7/2013 | Trum et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0290470 A1 | 10/2013 | CaraDonna et al. |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0227991 A1 | 8/2015 | Yu |
| 2015/0294273 A1 | 10/2015 | Barraci et al. |
| 2015/0302303 A1 | 10/2015 | Hakim |
| 2015/0341230 A1 | 11/2015 | Dave et al. |
| 2015/0363725 A1 | 12/2015 | Anderson et al. |
| 2015/0379061 A1 | 12/2015 | Paraschivescu |
| 2016/0063577 A1 | 3/2016 | Yellin et al. |
| 2017/0102246 A1 | 4/2017 | Yang |
| 2018/0068246 A1 | 3/2018 | Crivat et al. |

OTHER PUBLICATIONS

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://www.web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Search Report and Written Opinion for International Patent Application No. PCT/US2010/035021 dated Jul. 14, 2010.

International Preliminary Report on Patentability for International Patent Application No. PCT/US2010/035021 dated Nov. 24, 2011.

International Search Report and Written Opinion for International Patent Application No. PCT/US2012/028353 dated Oct. 31, 2012.

International Preliminary Report on Patentability for International Patent Application No. PCT/US2012/028353 dated Sep. 19, 2013.

(56) References Cited

OTHER PUBLICATIONS

International Search Report and Written Opinion for International Patent Application No. PCT/US2012/028378 dated Sep. 12, 2012.
International Preliminary Report on Patentability for International Patent Application No. PCT/US2012/028378 dated Sep. 19, 2013.
Extended European Search Report in EP Application No. 13151967.0-1955, dated Apr. 19, 2013.
Official Communication for U.S. Appl. No. 12/467,120 dated Oct. 4, 2011.
Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Oct. 23, 2013.
Official Communication for U.S. Appl. No. 12/467,120 dated Mar. 26, 2013.
Official Communication for U.S. Appl. No. 13/324,253 dated Sep. 25, 2012.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/324,253 dated Sep. 6, 2013.
Official Communication for U.S. Appl. No. 13/415,797 dated Oct. 3, 2013.
Official Communication for U.S. Appl. No. 13/452,628 dated Apr. 22, 2013.
Official Communication for U.S. Appl. No. 13/675,837 dated Oct. 10, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/917,503 dated Oct. 10, 2013.
Official Communication for U.S. Appl. No. 13/935,147 dated Oct. 22, 2013.
Official Communication for U.S. Appl. No. 13/452,628 dated Nov. 18, 2013.
Official Communication received in U.S. Appl. No. 14/033,130 dated Dec. 16, 2013.
Official Communication for U.S. Appl. No. 13/324,253 dated Jan. 23, 2014.
Official Communication for U.S. Appl. No. 13/675,837 dated Jan. 31, 2014.
Official Communication for U.S. Appl. No. 13/917,503 dated Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/20120114153849/http://aws.amazon.com/rds/reserved-instances/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/837,815 dated Apr. 27, 2015.
Office Communication for U.S. Appl. No. 13/452,628 dated Jun. 23, 2015.
European Search Report for Application No. 12755613.2 dated Jan. 26, 2015 (6 pages).
Office Communication for U.S. Appl. No. 13/452,628 dated Mar. 30, 2015 (18 pages).
Office Communication for U.S. Appl. No. 14/180,308 dated Apr. 17, 2015 (8 pages).
Office Communication for U.S. Appl. No. 13/917,503 dated Apr. 16, 2015 (19 pages).
Office Communication for U.S. Appl. No. 13/675,837 dated Apr. 16, 2015 (19 pages).
Extended European Search Report in EP Application No. 14159413.5 dated Jul. 4, 2014.
Office Communication for U.S. Appl. No. 13/452,628 dated Mar. 13, 2014.
Office Communication for U.S. Appl. No. 14/180,308 dated Apr. 8, 2014.
Office Communication for U.S. Appl. No. 14/180,308 dated Sep. 2, 2014.
Office Communication for U.S. Appl. No. 13/935,147 dated Apr. 11, 2014.
Office Communication for U.S. Appl. No. 13/935,147 dated Jun. 16, 2014.
Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/675,837 dated Jan. 31, 2014.
SAS Activity-Based Management, 2010, Fact Sheet, 4 pages.
Office Communication for U.S. Appl. No. 13/415,797 dated Apr. 9, 2014.
Office Communication for U.S. Appl. No. 13/917,503 dated Apr. 3, 2014.
Office Communication for U.S. Appl. No. 14/180,308 dated Jan. 30, 2015.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/415,797 dated Jan. 12, 2015.
Office Communication for U.S. Appl. No. 13/837,815 dated Apr. 7, 2014.
Office Communication for U.S. Appl. No. 13/675,837 dated Apr. 2, 2014.
Office Communication for U.S. Appl. No. 13/837,815 dated Sep. 25, 2014.
Office Communication for U.S. Appl. No. 13/324,253 dated Feb. 19, 2015.
Office Communication for U.S. Appl. No. 13/649,019 dated Feb. 10, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/935,147 dated Jul. 9, 2015.
Office Communication for U.S. Appl. No. 13/415,797 dated Oct. 19, 2015, 3 pages.
Office Communication for U.S. Appl. No. 13/837,815 dated Sep. 28, 2015, 20 pages.

(56) References Cited

OTHER PUBLICATIONS

European Examination Report for Application No. 14159413.5 dated Jul. 15, 2015, 9 pages.
Office Communication for U.S. Appl. No. 13/415,701 dated Oct. 27, 2015, 16 pages.
Office Communication for U.S. Appl. No. 13/365,150 dated Dec. 7, 2015, 3 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
Official Communication for U.S. Appl. No. 13/649,019 dated Jan. 4, 2016, 8 pages.
Official Communication for U.S. Appl. No. 14/869,721 dated Jan. 13, 2016, 57 pages.
Official Communication for U.S. Appl. No. 13/452,628 dated Jan. 12, 2016, 21 pages.
Office Communication for U.S. Appl. No. 13/415,797 dated Oct. 19, 2015.
Office Communication for U.S. Appl. No. 13/837,815 dated Sep. 28, 2015.
Office Communication for U.S. Appl. No. 13/649,019 dated Sep. 23, 2015.
Office Communication for U.S. Appl. No. 13/365,150 dated Sep. 24, 2015.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 7 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 14/867,552, dated Apr. 25, 2016, 12 pages.
Office Communication for U.S. Appl. No. 14/971,944, dated May 19, 2016, 17 pages.
Official Communication for U.S. Appl. No. 13/935,147 dated Mar. 9, 2016, 10 pages.
Stephen Muller and Hasso Platner, "An In-Depth Analysis of Data Aggregation Cost Factors in a Columnar In-Memory Database", ACM DOLAP'12, Nov. 2, 2012, Maui, Hawaii, USA, pp. 65-72.
Official Communication for U.S. Appl. No. 14/869,721 dated Jun. 1, 2016, 35 pages.
Official Communication for U.S. Appl. No. 14/977,368 dated Jun. 7, 2016, 11 pages.
Official Communication for U.S. Appl. No. 13/837,815 dated Apr. 13, 2016, 22 pages.
Official Communication for U.S. Appl. No. 13/837,815 dated Jun. 23, 2016, 3 pages.
Official Communication for U.S. Appl. No. 14/846,349 dated Jul. 1, 2016, 24 pages.
Official Communication for U.S. Appl. No. 14/981,747 dated Jul. 14, 2016, 29 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 14/867,552 dated Oct. 3, 2016, 19 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 13/415,797 dated Apr. 14, 2017, 3 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 15/351,313 dated Jan. 12, 2017, 7 pages.
Official Communication for U.S. Appl. No. 14/867,552 dated Jan. 9, 2017, 3 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 15/351,313 dated Jul. 18, 2017, 15 pages.
Official Communication for U.S. Appl. No. 13/837,815 dated Jun. 12, 2017, 12 pages.
Official Communication for U.S. Appl. No. 13/365,150 dated Aug. 23, 2017, 30 pages.
Official Communication for U.S. Appl. No. 15/260,221 dated Aug. 15, 2017, 21 pages.
Official Communication for European Application No. 13151967.0 dated Aug. 18, 2017, 7 pages.

(56) References Cited

OTHER PUBLICATIONS

European Search Report for European Application No. 10775648.8 dated Mar. 10, 2017, 6 pages.

Official Communication for European Application No. 12755613.2 dated Aug. 17, 2017, 7 pages.

Official Communication for U.S. Appl. No. 14/846,349 dated Sep. 8, 2017, 25 pages.

Official Communication for U.S. Appl. No. 13/452,628 dated Sep. 28, 2017, 26 pages.

Official Communication for U.S. Appl. No. 13/837,815 dated Sep. 28, 2017, 9 pages.

Official Communication for U.S. Appl. No. 13/415,797 dated Sep. 7, 2017, 26 pages.

Office Communication for U.S. Appl. No. 15/379,267 dated Jun. 30, 2017.

Official Communcation for U.S. Appl. No. 14/867,552 dated Jun. 29, 2017.

Official Communcation for U.S. Appl. No. 15/351,313 dated Jul. 18, 2017.

Official Communcation for U.S. Appl. No. 13/837,815 dated Jun. 12, 2017.

Official Communcation for U.S. Appl. No. 13/365,150 dated Aug. 23, 2017.

Official Communcation for U.S. Appl. No. 15/260,221 dated Aug. 15, 2017.

Official Communcation for European Application No. 13151967.0 dated Aug. 18, 2017.

European Search Report for European Application No. 10775648.8 dated Mar. 10, 2017.

Official Communcation for European Application No. 12755613.2 dated Aug. 17, 2017.

Official Communcation for U.S. Appl. No. 14/846,349 dated Sep. 8, 2017.

Official Communcation for U.S. Appl. No. 13/452,628 dated Sep. 28, 2017.

Official Communcation for U.S. Appl. No. 13/837,815 dated Sep. 28, 2017.

Official Communcation for U.S. Appl. No. 13/415,797 dated Sep. 7, 2017.

Official Communication for U.S. Appl. No. 14/869,721 dated Oct. 17, 2017, 30 pages.

Official Communication for U.S. Appl. No. 15/379,267 dated Oct. 6, 2017, 3 pages.

Official Communication for U.S. Appl. No. 13/935,147 dated Nov. 3, 2017, 11 pages.

Official Communication for U.S. Appl. No. 14/846,349 dated Nov. 20, 2017, 3 pages.

Official Communication for U.S. Appl. No. 13/917,503 dated Nov. 28, 2017, 26 pages.

Official Communication for U.S. Appl. No. 13/837,815 dated Jan. 26, 2018.

Official Communication for U.S. Appl. No. 14/869,721 dated Jan. 19, 2018.

Official Communication for U.S. Appl. No. 14/867,552 dated Feb. 13, 2018.

Official Communication for U.S. Appl. No. 15/859,008 dated Mar. 5, 2018.

Official Communication for U.S. Appl. No. 13/935,147 dated Jan. 17, 2018.

Official Communication for U.S. Appl. No. 14/867,552 dated Nov. 29, 2017, 12 pages.

Official Communication for U.S. Appl. No. 14/981,747 dated Dec. 12, 2017, 44 pages.

Official Communication for U.S. Appl. No. 13/917,503 dated Jul. 19, 2018, pp. 1-3.

Official Communication for U.S. Appl. No. 14/846,349 dated Jul. 20, 2018, pp. 1-40.

Official Communication for U.S. Appl. No. 14/981,747 dated Jul. 5, 2018, pp. 1-62.

Official Communication for U.S. Appl. No. 15/271,013 dated Jul. 6, 2018, pp. 1-49.

Official Communication for U.S. Appl. No. 15/379,267 dated Jul. 19, 2018, pp. 1-34.

Official Communication for U.S. Appl. No. 13/917,503 dated May 10, 2018, pp. 1-38.

Official Communication for U.S. Appl. No. 13/837,815 dated Apr. 5, 2018, pp. 1-4.

Official Communication for U.S. Appl. No. 14/869,721 dated May 11, 2018, pp. 1-33.

Official Communication for U.S. Appl. No. 14/867,552 dated May 31, 2018, pp. 1-22.

Official Communication for U.S. Appl. No. 15/351,313 dated Jun. 4, 2018, pp. 1-9.

Official Communication for U.S. Appl. No. 15/858,945 dated Apr. 4, 2018, pp. 1-74.

Official Communication for U.S. Appl. No. 15/859,058 dated May 14, 2018, pp. 1-76.

Official Communication for U.S. Appl. No. 13/935,147 dated Apr. 5, 2018, pp. 1-14.

Official Communication for U.S. Appl. No. 13/837,815 dated Jan. 26, 2018, 12 pages.

Official Communication for U.S. Appl. No. 14/869,721 dated Jan. 19, 2018, 3 pages.

Official Communication for U.S. Appl. No. 14/667,552 dated Feb. 13, 2018, 3 pages.

Official Communication for U.S. Appl. No. 15/859,008 dated Mar. 5, 2018, 20 pages.

Official Communication for U.S. Appl. No. 13/935,147 dated Jan. 17, 2018, 3 pages.

Official Communication for U.S. Appl. No. 15/659,058 dated May 14, 2018, pp. 1-76.

Official Communication for U.S. Appl. No. 15/379,267 dated Mar. 10, 2017.

Official Communication for U.S. Appl. No. 13/415,797 dated Apr. 14, 2017.

Official Communication for U.S. Appl. No. 14/180,308 dated Aug. 6, 2018, pp. 1-23.

Official Communication for U.S. Appl. No. 15/858,945 dated Sep. 10, 2018, pp. 1-25.

Official Communication for U.S. Appl. No. 15/858,008 dated Jul. 31, 2018, pp. 1-28.

Official Communication for U.S. Appl. No. 13/917,503 dated Nov. 20, 2018, pp. 1-55.

Official Communication for U.S. Appl. No. 14/869,721 dated Oct. 11, 2018, pp. 1-73.

Official Communication for U.S. Appl. No. 14/867,552 dated Nov. 21, 2018, pp. 1-37.

Official Communication for U.S. Appl. No. 15/260,221 dated Oct. 5, 2018, pp. 1-40.

Official Communication for U.S. Appl. No. 15/379,267 dated Oct. 18, 2018, pp. 1-9.

Official Communication for U.S. Appl. No. 15/859,058 dated Dec. 5, 2018, pp. 1-20.

Official Communication for U.S. Appl. No. 15/271,013 dated Dec. 18, 2018, pp. 1-47.

Official Communication for U.S. Appl. No. 13/935,147 dated Aug. 10, 2018, pp. 1-25.

Official Communication for U.S. Appl. No. 13/365,150 dated May 22, 2017, 3 pages.

Official Communication for U.S. Appl. No. 13/917,503 dated May 16, 2017, 29 pages.

Official Communication for U.S. Appl. No. 14/869,721 dated May 5, 2017, 49 pages.

Official Communication for U.S. Appl. No. 14/981,747 dated May 19, 2017, 43 pages.

Official Communication for U.S. Appl. No. 15/271,013 dated May 24, 2017, 37 pages.

Official Communication for U.S. Appl. No. 14/180,308 dated May 25, 2017, 21 pages.

Official Communication for U.S. Appl. No. 14/180,308 dated Dec. 22, 2017, 18 pages.

(56) References Cited

OTHER PUBLICATIONS

Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 14/846,349 dated Jan. 18, 2018, 29 pages.

* cited by examiner

| GL Actuals.ID | Cost |
|---|---|
| 301, Payroll (IT OPERATIONS) | $237,000 |
| 330, Employee Benefits (IT OPERATIONs) | $49,000 |
| 320, Payroll Taxes (IT OPERATIONS) | $4,100 |
| 760, Repairs (IT OPERATIONS) | $18,000 |
| 759, Rent Equipment (IT OPERATIONS) | $18,000 |
| 711, Fees and Consulting (IT OPERATIONS) | $7,600 |
| 650, Training (IT OPERATIONS) | $6,200 |
| 777, Miscellaneous Expense | $1,800 |

| Target | HI | Source | HIRV | RV | Cost | HI Src |
|--------|----|--------|------|-----|------|--------|
| W1 | S1 | SEA | 1 | 0.5 | $70 | $140 |
| W1 | S1 | CHI | 0 | 0.5 | $0 | $140 |
| W1 | S2 | SEA | 1 | 0.5 | $70 | $140 |
| W1 | S2 | CHI | 0 | 0.5 | $0 | $140 |
| W1 | S3 | SEA | 0 | 0.5 | $0 | $40 |
| W1 | S3 | CHI | 1 | 0.5 | $20 | $40 |
| W2 | S1 | SEA | 1 | 0.5 | $70 | $140 |
| W2 | S1 | CHI | 0 | 0.5 | $0 | $140 |
| W2 | S2 | SEA | 1 | 0.5 | $70 | $140 |
| W2 | S2 | CHI | 0 | 0.5 | $0 | $140 |
| W2 | S3 | SEA | 0 | 0.5 | $0 | $40 |
| W2 | S3 | CHI | 1 | 0.5 | $20 | $40 |

ALLOCATING HERITAGE INFORMATION IN DATA MODELS

TECHNICAL FIELD

The present invention relates generally to computer automated activity based budget modeling, forecasting and cost accounting, and more particularly, but not exclusively to generating improved object allocation rates.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial allocation model may increase as the number of tracked activities and elements increases. Therefore, for larger enterprises, sophisticated computer programs and computers are often required to assist in generating useful and relevant budgets based on financial allocation models.

In some cases, the large number of items and entities required for financial modeling can make development of modeling applications difficult. Further, the size and complexity of modern financial allocation models can make it difficult to design allocation rules for the cost allocations between groups and/or items within the model. Historically, the size and complexity of these financial allocation models have made it difficult to accurately ascertain a total cost of ownership for an offering such as a product and/or service. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 8 shows a portion of assignment ratios for an allocation rule that employs heritage information in accordance with at least one of the various embodiments;

DESCRIPTION OF THE VARIOUS EMBODIMENTS

Figure 1:
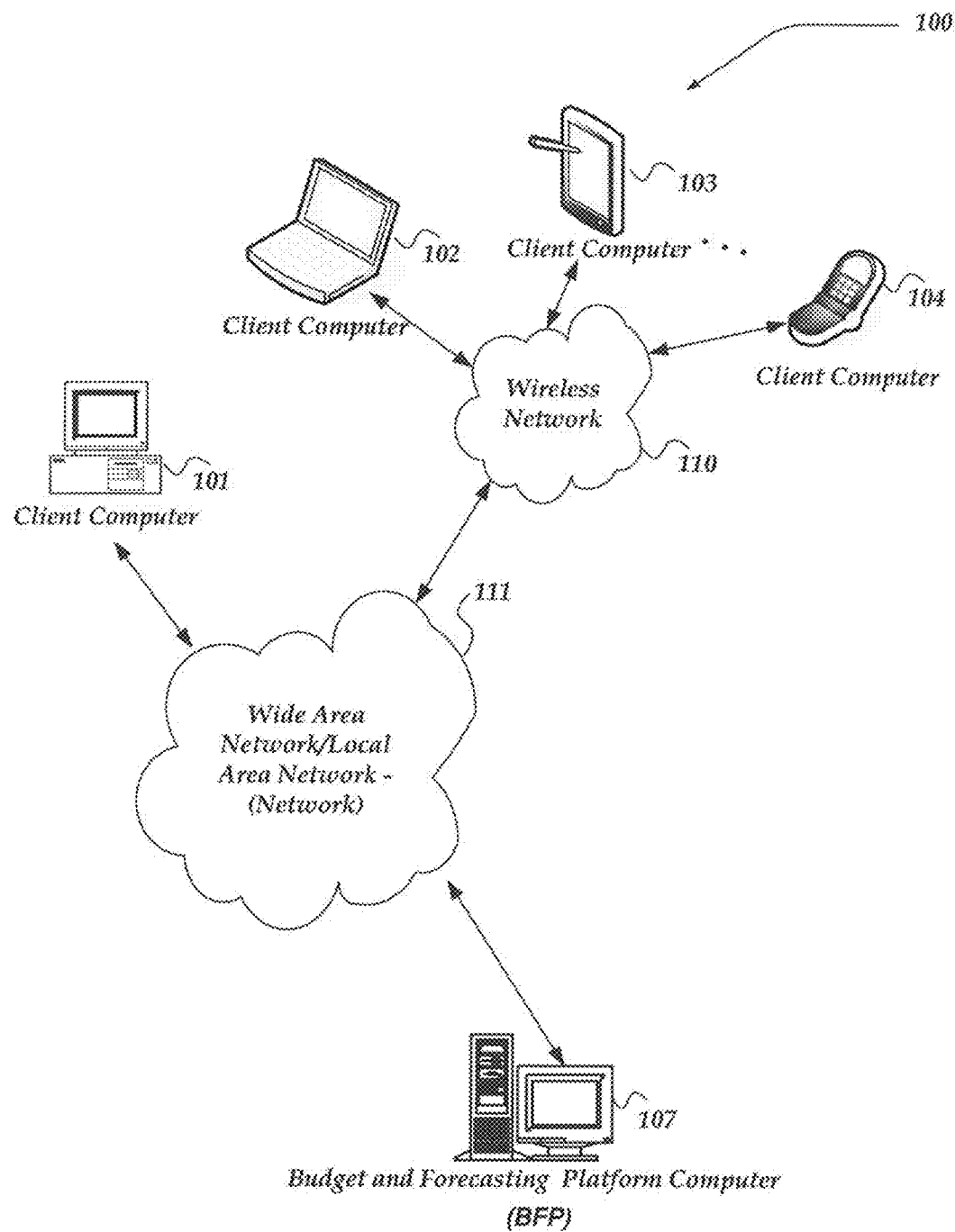
FIG. 1 illustrates a system diagram showing components of an environment in which at least one of the various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, computers, or devices. Accordingly, the present invention may take the form of an entirely hardware embodiment, an entirely software embodiment or m embodiment combining software and hardware aspects. The following/detailed description is, therefore, not to betaken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The, term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the terms "Cost line item," and "line item" refer to a single line item in a budget (or finance allocation model) and its associated cost/expense. For example, the costs associated with a particular computer that is an email server maybe a single item having a particular cost (e.g., the email server may correspond to a cost line item).

As used herein, the term "Category," refers to a set and/or class of cost line items that may be grouped together. Also, dataset information in fields of a dataset template may be mapped to one or more categories in a category template. For example, a collection of computers performing services such as email, web serving, enterprise resource planning, may represent separate cost line items and they may be grouped into the Servers category.

As used herein, the terms "Allocation rules," "entity propagation rules," or "propagation rules" refer to rules in the financial data model that determine how the costs/expenses from a category are allocated between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category as well as the cost line item level.

As used herein, the term "Assignment ratios," refers to an allocation rule, or the results of applying one or more rules, of the distribution ratio of costs to cost line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein, the terms "business system" and/or "generated business system" refers to a system that has been generated using the budget and forecasting platform. Various embodiments disclosed herein may be related to financial applications. But, one of ordinary skill the art will appreciate that generated business systems are not limited to financial applications.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such, as an XML file.

As used herein, the term "offering" refers to any service, product, or combination of service(s) and/or product(s) that may be provided by a system.

As used herein, the term "total cost value" refers to a value that is determined for providing at least one offering. A model for determining the total cost value of the at least one offering is based at least on an allocation of cost data to at least one category in a category template.

As used herein, the term "data object" refers to an object in a financial data model that may be providing values (e.g., costs/expenses) that may be allocated to one or more other data objects. In at least one of the various embodiments, data objects may be used to represent one or more categories in a data model in some embodiments, data objects depending on the context, data objects may be source objects, target objects, heritage objects, or the like.

As used herein, the term "source object" refers to an object in a financial data model that may be providing values (e.g., costs/expenses) that may be allocated to one or more other objects (target objects). In at least one of the various embodiments, source objects may be used to represent one or more categories in a data model.

As used herein, the term "target object" refers to an object in a financial data model that may be allocated values (e.g., costs/expenses) from one or more other objects (source objects). In at least one of the various embodiments, target objects may be used to represent one or more categories in a data model.

As used herein, the term "heritage information," and "heritage costs" refer to allocation information that is associated with one or more data model objects that are below a source object. In at least one of the various embodiments, heritage information that is exposed in a source object is information from one or more of the data objects that may contribute cost information to the source object. Heritage information exposed in a source object may be incorporated in the allocation rules and/or assignment ratios for a target object.

As used herein, the term "heritage object" refers to an object in a financial data model that may be providing and/or exposing heritage information (e.g., costs/expenses) to one or more other objects in the data model.

As used herein, the term "heritage object line item," refers to a single line item in a heritage object in at least one of the various embodiments, heritage object line items may be selectively exposed/designated to provide heritage information to data model objects.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards allocating costs for a plurality of cost objects. In at least one of the various embodiments, a target object, a source object and one or more heritage objects may be determined based on a data model such that the heritage objects may be associated with the source object. In at least one of the various embodiments, at least one line item in the source object may be generated based in part on allocating costs from the heritage objects with the generated source object line items include assignment ratio data from line items from the heritage object.

In at least one of the various embodiments, at least one line item in the target object may be generated based in part on allocating costs from the source object. And, in at least one of the various embodiments, at least one generated target object line item may be based on at least one the generated source object line item and the assignment ratio data. In at least one of the various embodiments, a final cost value for the target object may be generated based on a sum of each target object line item and displayed in the data model.

In at least one of the various embodiments, allocating costs from the source object may further include determining a target object assignment ratio based on a combination of the source object line assignment ratio and the heritage object line item assignment ratio.

In at least one of the various embodiments, a portion of the cost of a target object line item that is contributed from at least one heritage object line item may be displayed as on the data model. In at least one of the various embodiments, heritage objects in the data model may be determined such that heritage information may be propagated to each intervening data object between the source object and the heritage object.

In at least one of the various embodiments, a list of potential heritage objects associated with source object may be displayed such that each potential heritage object may be located (in the model) below the source object. Also, in at least one of the various embodiments, one or more filters may be included in the allocation rules to determine the source object line items and the heritage object line items.

In at least one of the various embodiments, generating at least one line item in the target object, may also include, computing a cost allocated to the generated target object line items may be based on a combination of a heritage information ratio value and a source object line item ratio value, wherein the heritage information ratio value may correspond to the assignment ratio data from a line item of the heritage object.

Illustrative Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")—(network) 111, wireless network 110, client computers 101-104, and Budget and Forecasting Platform (BFP) 107.

Generally, client computers 102-104 may include virtually any portable computer capable of receiving and sending a message over a network, such as network 111, wireless network 110, or the like. Client computers 102-104 may also be described generally as client computers that are configured to be portable. Thus, client computers 102-104 may include virtually any portable computer capable of connecting to another computer and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, computer, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile computer may have a touch sensitive screen, a stylus, and several lines of color LCD in which both text and graphics may be displayed.

Client computer 101 may include virtually any computer capable of communicating over a network to send and receive information, including messaging, performing various online actions, or the like. The set of such computers may include computers that typically connect using a wired or wireless communications medium such as personal computers, tablet computers, .multiprocessor systems, microprocessor-based or programmable consumer electronics, network Personal Computers (PCs), or the like. In at least one of the various embodiments, at least some of client computers 102-104 may operate over wired and/or wireless network. Today, many of these computers include a capability to access and/or otherwise communicate over a network such as network 111 and/or wireless network 110. Moreover, client-computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language. Including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computer. Client applications may include a capability to provide requests and/or receive data relating to the cost models, budget reports, budget project information, allocation rules, or the like. The client application may provide data representing assignment and/or allocation changes, selecting templates, editing cost allocations between or among categories, activating heritage information, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile computers, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LIE), or the like. In essence, wireless network 110 may include virtually any wireless communication mechanism by which information may travel between client computers 102-104 and another computer, network, or the like.

Network 111 is configured to couple network computers with other computers, including, BFP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, foil or fractional dedicated digital lines including T1, T2S T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computers.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 2:
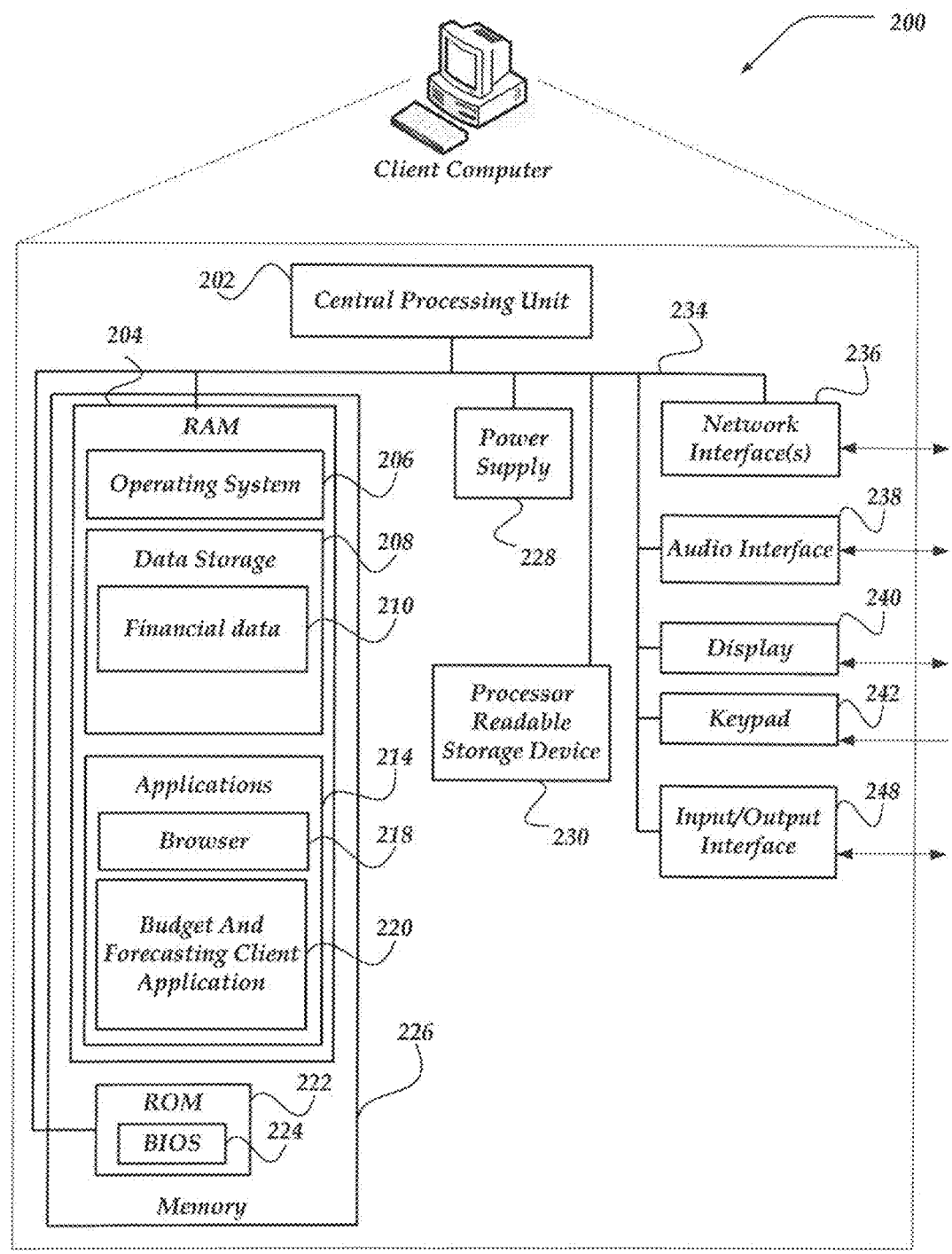
FIG. 2 shows one embodiment of a client computer that may be included in a system.

BFP 107 may include virtually any network computer usable to perform data processing operation that may be used for generating cost models, data models, allocation rules, recursive allocation rules, cost allocations, heritage information, total cost values for offerings, displays and/or reports thereof such as network computer 200 of FIG. 2. In at least one of the various embodiments, BFP 107 employs various techniques to create, define, generate, and/or automated data processing applications such as budgeting and financial management applications and one or more cost models and/or data models. BFP 107 may include modules for generating data processing applications that may apply models that may include dataset templates, category templates, allocation rules, recursive allocation rules, heritage information, or the like. Furthermore, BFP 107 may include and/or generate data processing applications for visualizing the generated allocation categories, cost allocations, budgets, cost models, data models, allocation rules, recursive allocation rules, total, cost values for offerings, heritage information, or the like.

Computers that may operate as BFP 10 include various network computers, including, but not limited to personal computers, desktop computers, multiprocessor systems, microprocessor-based or programmable consumer electronics, network PCs, server computers, tablet computers, network, appliances, or the like. It should be noted that while BFP 107 is illustrated as a single network computer, the invention is not so limited. Thus, in another embodiment, BFP 107 may represent a plurality of network computers. For example, in at least one of the various embodiments, BFP 107 may be distributed over a plurality of network computers and/or implemented using cloud architecture.

Moreover, BFP 107 is not limited to a particular configuration. Rather, BFP 107 may operate using a controller/worker approach over a plurality of network computers, within a cluster, a peer-to-peer architecture, cloud-based architecture (e.g., virtual machines), and/or any of a variety of other architectures. Thus, BFP 107 is not to be construed as being limited to a single environment, and other configurations, and architectures are also envisaged. BFP 107 may employ processes and such as described below in conjunction with FIG. 4 and above to perform at least some of its actions.

Illustrative Client Computer

FIG. 2 shows one embodiment of client computer 200 that may be included in a system implementing at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 101-104 of FIG. 1.

As shown in the figure, client computer 200 includes a central processing unit ("CPU") 202 in communication with a mass memory 226 via a bus 234. Client computer 200 also includes a power supply 228, one or more network interfaces 236, an audio interface 238, a display 240, a keypad 242, and an input/output interface 248. Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies, including, but not limited to, global system for mobile communication ("GSM"), code division multiple access ("CDMA"), time division multiple access ("TDMA"), LTE, HSDPA, user datagram protocol ("UDP"), transmission control protocol/internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 may be arranged to produce and receive audio signals such as the sound of a human voice. For example, audio interface 238 may be coupled to a speaker and microphone (not shown) to enable, telecommunication with others and/or generate an audio acknowledgement for some action. Display 240 may be a liquid crystal display ("LCD"), gas plasma, light emitting diode ("LED"), organic LED, electronic ink, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on a variety of events, including being sent as part of a header during a communication, sent upon request, or the like. At least a portion of the information may also be stored on a disk drive or other computer-readable storage device (not shown) within client computer 200. Further, as illustrated, data storage 208 may also financial data 210. In some embodiments, financial data 210 may include a database, text, spreadsheet, folder, file, or the like, that may be configured to maintain and store various budget, data, allocation rules, recursive allocation rules, audit logs, dataset templates, category-templates, datasets, heritage information, or the like. Such financial data 210 may also be stored within any of a variety of other computer-readable storage devices, including, but not limited to a hard drive, a portable storage device, or the like, such as illustrated by non-transitory computer-readable storage device 230. In yet other embodiments, data storage 208 may also store data associated with cost data models that may be generated in part by BFP 107.

Applications 214 may include computer executable instructions which, when executed by client computer 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and budget and forecasting client application 220.

Browser 218 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client computer 200 to communicate with another network computer, such as BFP 107 of FIG. 1. In one embodiment, browser 218 may enable a user to view and/or manipulate data models, heritage information, budget projects, including creating budgets, modifying cost models, generating and/or updating recursive allocation rules, or the like.

In at least one of the various embodiments, a user may employ client computer 200 to manage budgeting and finance applications, and to access information stored or otherwise managed through BFP 107. Also, in at least one of the various embodiments, the user may be enabled to perform a variety of actions on the data, including, queries, comparisons, summations, analysis, or the like. Additionally, in at least one of the various embodiments, a user may employ client 200 to automate one or more processes that may be used for generating business systems, cost models, budget projects, or the like. In at least one of the various embodiments, budget and forecasting client application 220 may be arranged to enable a user to rapidly generate business systems that include allocation rules, recursive allocation rules, cost values, cost models, data models, heritage information, or the like. In at least one of the various embodiments, application 220 may be arranged to generate and render visualizations and display reports of allocation rules among cost categories in a cost model.

In any event, budget and forecasting client application 220 may employ processes similar to those described below and illustrated in FIG. 4 and above to perform at least some of its actions.

Illustrative Network Computer

Figure 3:
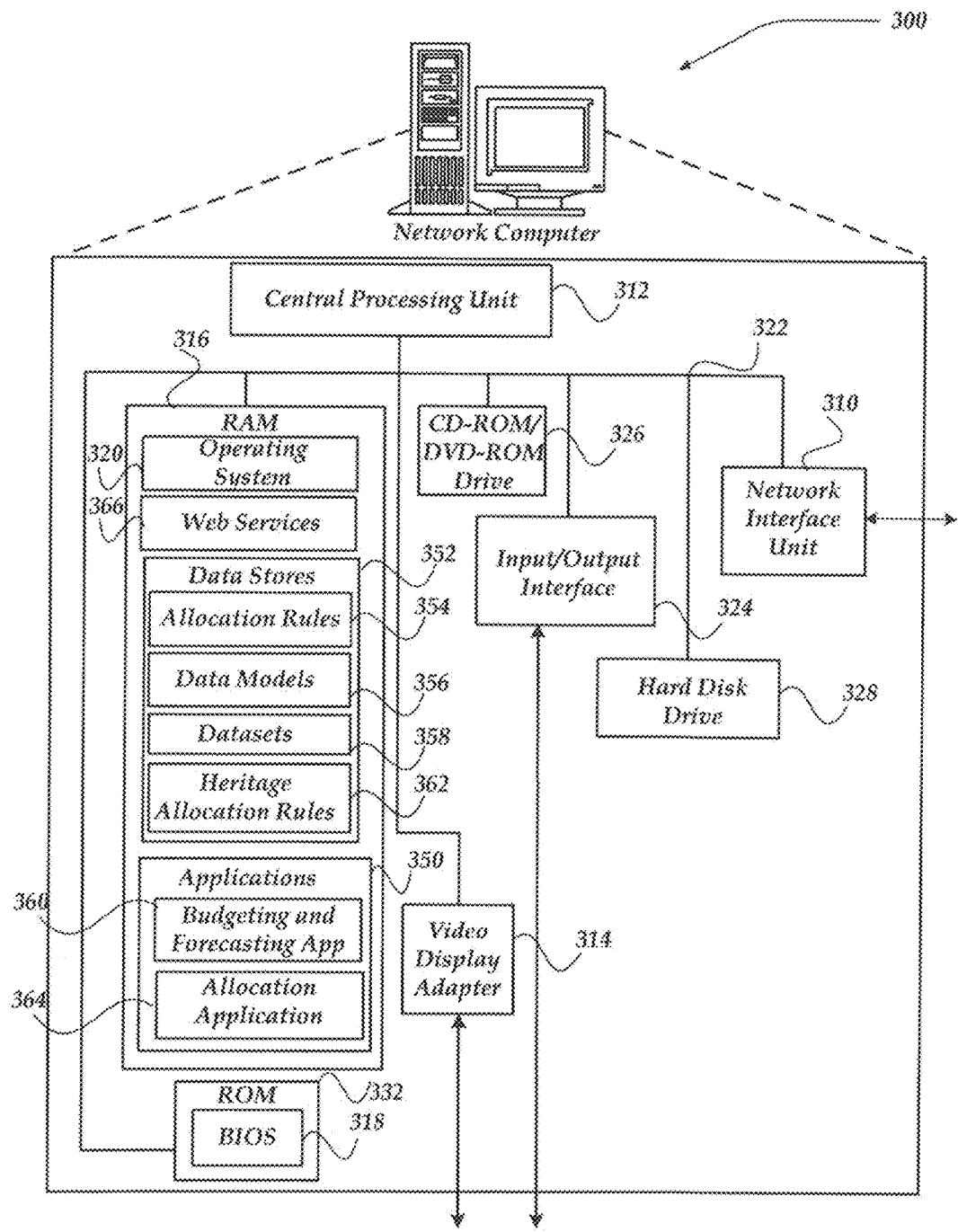
FIG. 3 illustrates one embodiment of a network computer that may be included in a system.

FIG. 3 shows one embodiment of network computer 300 that may be included in a system implementing at least one of the various embodiments. Network computer 300 may include many more or less components than those shown. The components shown, however, are sufficient to disclose an illustrative embodiment for practicing the invention. Network computer 300 may represent, for example, BFP 107 of FIG. 1.

Network computer 300 includes processing unit 312, video display adapter 314, and a mass memory, all in communication with each other via bus 322. The mass memory generally includes RAM 316. ROM 332, and one or more permanent mass storage devices, such as hard disk drive 328, tape drive, optical drive, flash drive, and/or floppy disk drive that may be coupled to a processor such as CPU 312. The mass memory stores operating system 320 for controlling the operation of network computer 300. Any general-purpose operating system may be employed. Basic input/output system ("BIOS") 318 is also provided for controlling the low-level operation of network computer 300. As illustrated in FIG. 3, network computer 300 also can communicate with the internet, or some other communications network, via network interface unit 310, which is constructed for use with various communication protocols including the TCP/IP protocol Network interface unit 310 is sometimes known as a transceiver, transceiving device, or network interface card (NIC). Network computer 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor readable storage media. Processor-readable storage media (devices) may include volatile, nonvolatile, removable, and non-removable media implemented in any method, or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computer.

As shown, data stores 352 may include a database, text, spreadsheet, folder, file, or the like, that may be configured to maintain and store various cost models, budget data, audit logs, device data, such as, allocation rules 354, data models 356, datasets 358, or the like. In at least one of the various embodiments, data stores 352 may former include program code, data, algorithms, or the like, for use by a processor, such as central processing unit (CPU) 312 to execute and perform actions. In at least one of the various embodiments, at least some of data and/or instructions stored in data stores 352 might also be stored on another computer of network computer 300, including, but not limited to cd-rom/dvd-rom 326, hard disk drive 328, or other computer-readable storage device resident on network computer 300 or accessible by network computer 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include allocation rules 354, web services 366, data models 356, datasets 358, budget and forecasting application 360, allocation application 364, heritage allocations rules 362, or the like.

Web services 366 represent any of a variety of services that may be configured to provide content, over a network to another computer. Thus, web services 366 include for example, a web server, a File Transfer Protocol (FTP) server, a database server, a content server, or the like. Web services 366 may provide the content over the network using any of a variety of formats, including, but not limited to WAP, HDML, WML, SGML, HTML, XML, compact HTML (cHTML), extensible (xHTML), or the like.

In at least one of the various embodiments, budget and forecasting application 360 may enable a user to generate budgets, allocation rules, recursive allocation, data model, cost models, total cost values for offerings, reports, heritage information, or the like. Also in at least one of the various embodiments, budget and forecasting application 360, and/or allocation application 364 may employ processes, or parts of processes, similar to those described below and shown in FIG. 4 and above to perform at least some of its actions.

Illustrative Logical System Architecture

FIGS. 4-7 are presented to illustrate logical architectures at least one of the various embodiments for allocating heritage information in data models. Furthermore, one of ordinary skill the art will appreciate that objects and architectures discussed herein may be implemented using one or more computer programming languages, computer scripting languages, database stored procedures, or the like, or combination thereof. Further, in at least one of the various embodiments, cost objects and/or data model objects may be stored and/or implemented using databases, including, SQL databases, object oriented databases, column-oriented databases, NoSQL databases, custom databases, or the like, combination thereof.

Figure 4:
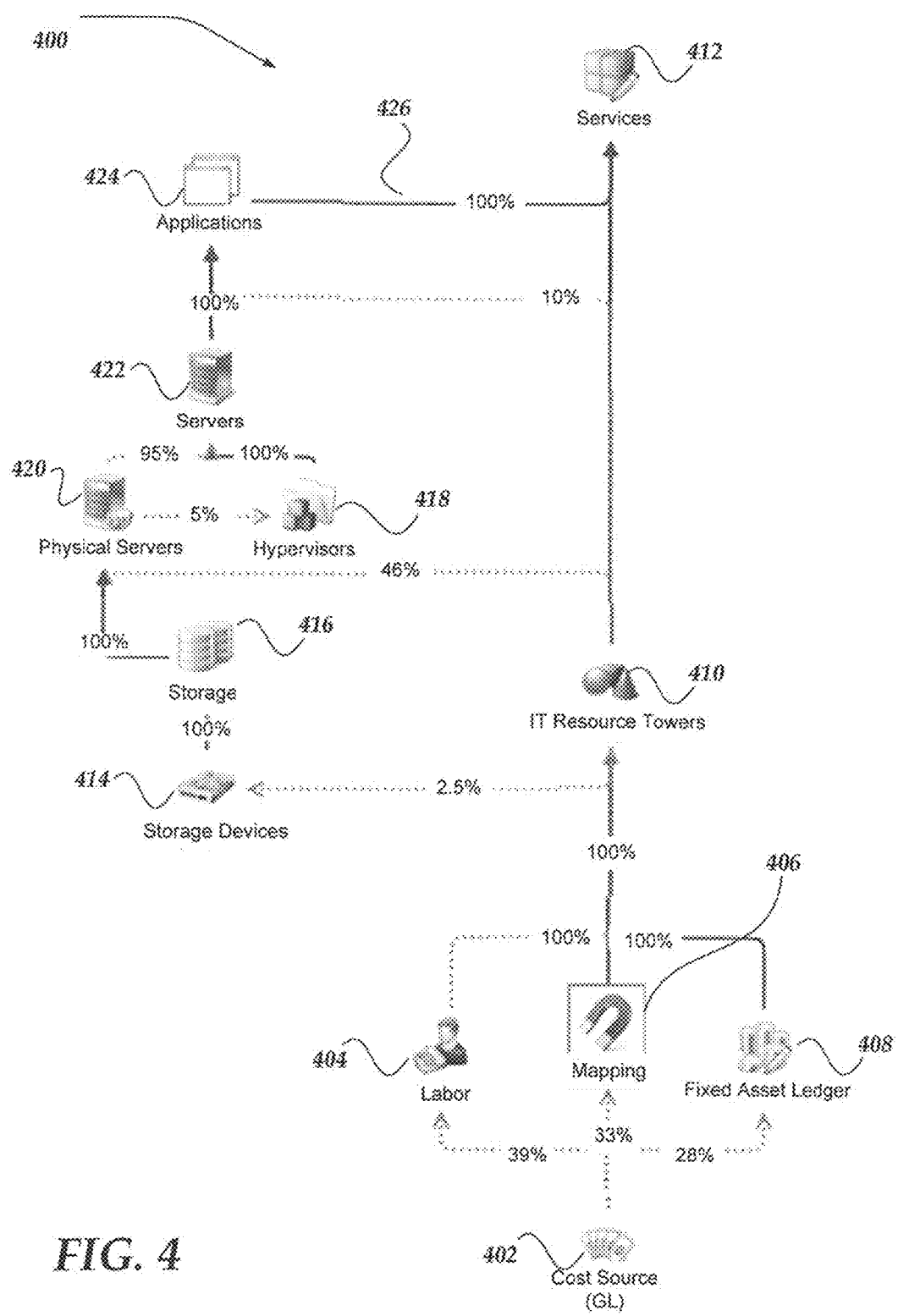
FIG. 4 shows one embodiment of a model for automatically generated business system.

FIG. 4 shows, for at least one of the various embodiments model 400 that may be generated using budget and forecasting platform 107. In at least one of the various embodiments, in this example, model 400 represents a business system and starts with costs flowing from cost source 402, which may be a general ledger (GL) or other type of financial data. In this model, cost source 402 flows to labor 404, fixed asset 408, and to category mapping 406.

In at least one of the various embodiments, in model 400, labor 404 may be allocated 39% of costs, fixed assets 28% of costs, and the remaining 33% may be allocated to a mapping component In at least one of the various embodiments, based on a selected category template, the costs allocated to mapping component 406 may be allocated to the various cost categories that may make up the business system being model.

In at least one of the various embodiments, model 400 shows that 100% of costs flow to IT resource tower 410. From IT resource tower 410 costs flow to services 412. Thus, for this business system, model 400 shows that all the costs are allocated to producing the service offerings that the modeled business organization provides.

In at least one of the various embodiments, the budget and forecasting application may further enable users to gain additional understanding of how the costs from cost source 402 flow through the entire system. Model 400 shows that storage device 414 is responsible for 2.5% for the costs coming from cost source 402. And, that 100% of the costs of storage device 414 flows into the general category of for storage, shown by the allocation trace that shows of 100% of flowing from the storage device 414 to storage component 416. Likewise, model 400 shows that physical servers 420 are burdened by 100% of the costs of storage 416. And, since the business organization modeled by model 400 includes hypervisors that run on physical servers, the costs associate with hypervisor 418 flow from physical server 420. In at least one of the various embodiments, cost for the server category, servers 422 is constituted out of physical servers 420 and hypervisors 418, thus the costs for server 422 flow from those components. Further the applications 424 component of the model may be burdened with 100% of the costs associated with servers 422. Completing the loop, allocation rule 426 shows that service component 412 may be burdened with 100% of the costs associate with applications 424.

Figure 5:
FIG. 5 illustrates a table that may include dataset information.

FIG. 5 shows table 500 that may include information related to datasets that may be used by budget and forecasting platform 107 for generating business systems and data models. In at least one of the various embodiments, table 500 shows an example of source cost data in the form of a dataset of General Ledger (GL) accounting records that may be provided by at least one external data source. In at least one of the various embodiments, a dataset may have more or less columns and detail as shown in table 500. In at least one of the various embodiments, dataset information such as shown in table 500 may be provided in various well-known formats and structures. For example, table 500 may be provided as one or more, XML files, comma separated files, directly from database tables, or the like. Also, in at least one of the various embodiments, datasets may be provided in non-standard formats (e.g., proprietary) where custom scripts and applications may be employed to extract and/or parse values from the datasets.

In at least one of the various embodiments, other types of raw datasets may be provided by other external data sources to budget and forecasting platform 107. For example, datasets that include information about physical IT assets, fixed assets, software licenses, employees, labor costs, insurance records, vendor costs, utility costs (electricity, water, sewer, broadband, natural gas, oil, or the like), consulting expenses, legal fees, or the like.

Figure 6:
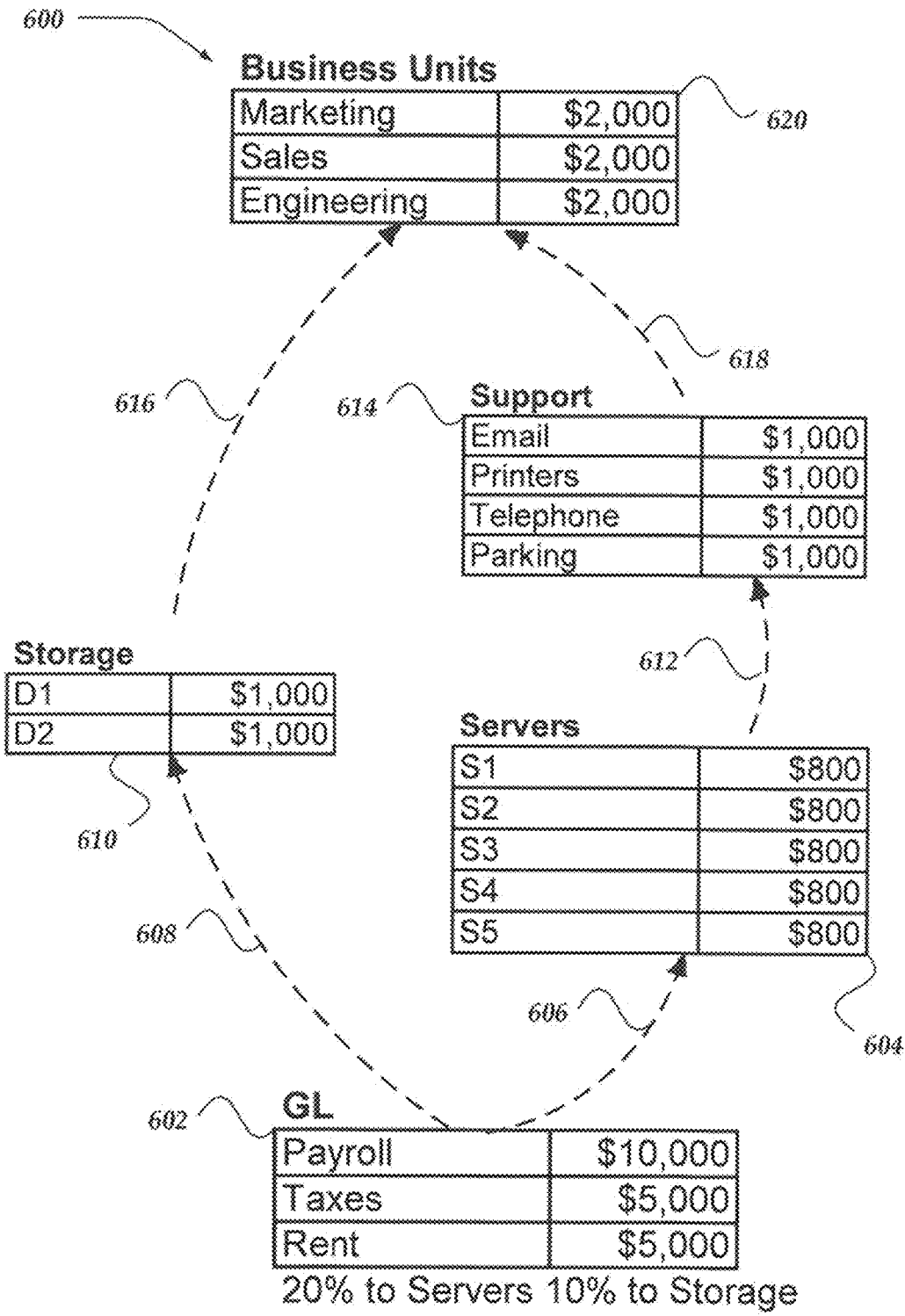
FIG. 6 shows a logical architecture of a model for an automatically generated business system.

FIG. 6 illustrates a portion of a logical architecture for model 600 that may be enabled by at least one of the various embodiments.

In at least one of the various embodiments, the model 600 may have five categories: GL 602, Servers 604, Storage 610, Support 612, and Business Units 616. In at least one of the various embodiments, each category contains a set of cost line items. For example, GL 602 includes cost line items for Payroll, Taxes and Rent. Likewise, Support 612 includes cost line items Email, Printers, Telephone, and Parking. In at least one of the various embodiments, each cost line item has one or more associated cost values. For example, Storage 610 has two cost line items, D1, and D2 (e.g., disk drives) having associated cost values of $1000 each.

Allocation rules may used to connect categories and/or objects of model 600. In at least one of the various embodiments, allocation rules may show how costs (money) flow between the categories. Resulting in a graph where the categories may be represented as nodes and the allocation rules may be represented as edges. In at least one of the various embodiments, generally a model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, allocation rule 606 represents a rule allocating 20% of the money in category GL 602 (source object) to Servers category 604 (target object). In this example, GL 602 includes a total of $20,000, thus 20% of $20,000 (e.g., $4,000) flows based on allocation rule 606 to Servers 604. Likewise, allocation rule 608 may allocate $2,000 from GL 602 to Storage 610. The other allocation rules in model 600 allocate 100% of the money to the next category: allocation rule 612 directs 100% of the money (e.g., $4,000) to flow to Support 614; allocation rule 618 directs 100% of the money in Support (e.g., $4,000) to flow to Business Units 620; and allocation rule 616 directs 100% of the money from Storage 610 to flow to Business Units 620.

In at least one of the various embodiments, money that flows into the category may be allocated among the included cost line items. In at least one of the various embodiments, each category may have one or more rules that may describe the assignment ratios for how the money in a category may be-assigned to cost line items. For the categories 604, 610, 612, and 618, simple allocation rules assign the money in the category evenly among the cost line items comprising each category. GL 602 may have different assignment ratios, in this non-limiting example, the assignment ratio between the cost line items may be 50% to Payroll, 25% to Taxes, and 25% to Rent.

In at least one of the various embodiments, an assignment ratio may represent how the money in an actual budget may be assigned to the actual cost line items. In at least one of the various embodiments, rules may be applied that distribute the money based on formulas that may be defined by the users or administrators who designed the model. In at least one of the various embodiments, the assignment ratios and allocations may be modified as part of the modeling process.

The model 600 is a simplified model useful for facilitating discussion and understanding of the embodiments, since allocation rules for models of large commercial entities can be numerous and complex. However, model 600 is at least sufficient to enable one of ordinary skill in the art to practice what is claimed herein.

Figure 7:
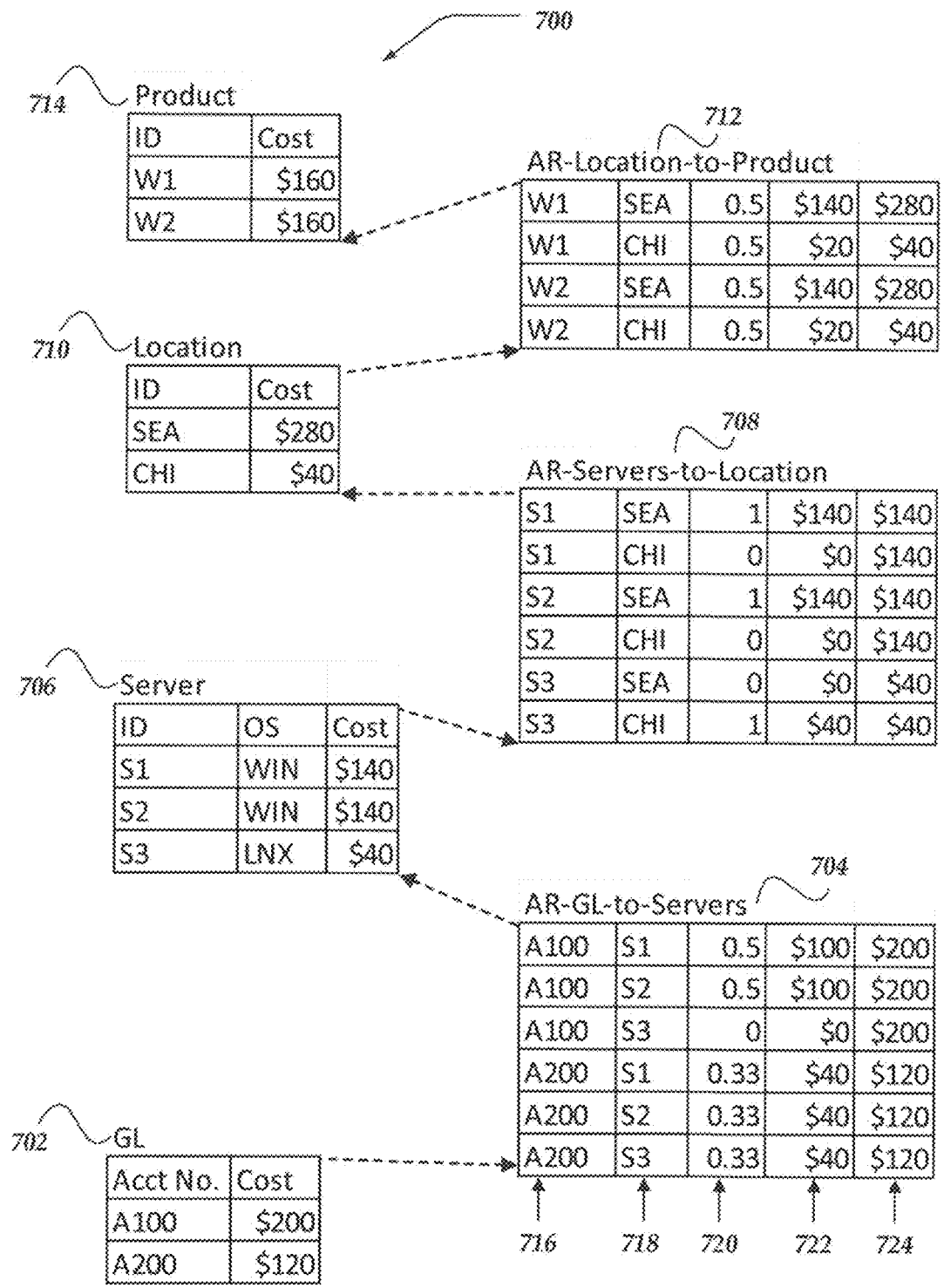
FIG. 7 shows a portion of a data model in accordance with at least one of the various embodiments.

FIG. 7 shows a portion of data model 700 in accordance with at least one of the various embodiments. In at least one of the various embodiments, as mentioned above, data models may be arranged to model how costs may be allocated to different objects (e.g., categories) that are part of a business system. (See, FIGS. 4-6 and their accompanying descriptions.) Data model 700 represents a segment of a data model that models the allocation of costs from a cost source, such as GL object 702. In this model GL object 702 allocates costs using allocation rule 704 to server object 706. Next, in at least one of the various embodiments, data model 700 shows that the costs may be further allocated, using allocation rule 708 from server object 706 to location object 710. And, in at least one of the various embodiments, the costs from location object 710 may be allocated according to allocation rule 712 to product object 714. Note, for this example, product object 714 simply represents the boundary of this model segment. Thus, in at least one of the various embodiments, it may be a terminating node, a business service object, a business unit object, or the like.

In at least one of the various embodiments, the details of how costs may be allocated from one object in the model to another may be encapsulated in one or more allocation rules. In at least one of the various embodiments, allocation rules may generate one or more assignment ratio tables that describe how cost values flow between the modeled objects. Allocation rules 704, 708, and 712 are illustrated in the form of assignment ratio tables. In some embodiments, the allocation rule may define how an assignment ratio table may be arranged.

In at least one of the various embodiments, an assignment ratio table may be arranged to include one or more columns of information, such as, source object line item 716, target object line item 718, assignment ratio 720, allocation value 722, source value 724, or the like. In this example, the entries in the source object line item column 716 correspond to the line items in GL object 702. Namely, A100 and A200 (e.g., representing account names from a chart-of-accounts). Also, file entries in target object line item column 718 correspond to the line items comprising server object 706 (e.g, S1, S2, and S3). The next column, assignment ratio column 720, contains a value for computing how much money flows from the source object line item to the target object line item. In this example, allocation rule 704 reflects that the money from A100 is evenly divided between servers S1 and S2. Likewise, one-third (0.33) of the money from A200 is allocated to server S1, server S2, and server S3. Column 722 in allocation rule 704 assignment ratio table shows the amount of money that flows from the source object line item to the target item. And column 724 shows the amount of money that the source object line item starts with. For example, based on GL object 702, A100 starts with $200 and A200 starts with $120. Thus, since the assignment ratio for A200 is one-third to each server, each server is allocated $40 from A200. Further, since, in this example, S3 is not allocated any money from A100, S1 and S2 split the $200 evenly. In at least one of the various embodiments, the values in server object 706 show the costs that were allocated to each server. Similarly, the remaining objects in model 700 may be allocated costs based on their respective allocation rules.

In at least one of the various embodiments, the underlying reasons for employing a particular allocation rule may depend on the objects that are being modeled. For example, in model 700, account A100 is modeled as a line item in GL object 702 and it may represent the cost of operating system software licenses. And A200, also modeled as a line item in GL object 702, may represent the cost of electricity. In this example, referring to Server object 706, it is shown that line items S1 and S2 represent servers using a commercial operating systems that are subject to license fees, while line item S3 represents a server using an open source operating system with no license fees. Thus, S1 and S2 are allocated portions of the operation system licensing fee (A100) while S3 is not. However, in this example, all three servers use electricity so the costs from A200 are spread evenly across all three servers. Likewise, in at least one of the various embodiments, the example allocation rule 708 reflects that in model 700, S1 and S2 are located in Seattle (SEA), and S3 is located in Chicago (CHI). Further, in this example, allocation rule 712 represents that the costs for product W1 and product W2 are evenly divided between Seattle and Chicago.

In at least one of the various embodiments, it may be advantageous for a data model to be arranged to report additional details regarding to origins of the money allocated to a line item. For example, model 700 shows that of the original $320 in the model $160 was allocated for producing product W1 and $160 was allocated for producing W2. (See, product object 714). However, model 700 as arranged, cannot easily answer the question of how much of the expense of product W1 may be attributed to server S1. At least one reason this may be difficulty is that product object 714 is allocated money from location object 710 yet it does not have visibility the details relating to how the server line items in server object 706 contribute money to the different location line items in location object 710.

One of ordinary skill in the art will appreciate that allocation rules 704, 708, and 712 are non-limiting examples, and that real-life data models may include arbitrarily complex allocation rules that may include arbitrarily complex formulas for generating assignment ratio tables and mapping costs and/or values between model objects. However, the allocation rules illustrated in herein are sufficient to at least describe, enable, and disclose at least the innovations contained in this application.

FIG. 8 shows a portion of allocation rule 800 in accordance with at least one of the various embodiments. In at least one of the various embodiments, allocation rule 800 represents an example of an allocation rule that may have been arranged to include heritage information. In at least one of the various embodiments, heritage information may enable the data model to represent additional detail that may have otherwise been obscured by intervening objects.

In at least one of the various embodiments, allocation rule 800 is an example of an allocation rule that includes an assignment ratio table that may have various columns for including heritage information. Column 802 may indicate the target object line items (by name); column 804 may indicate a heritage object line item (by name); column 806 may indicate source object line items (by name); column 808 may include assignment ratio information for the heritage information line items; column 810 may include the assignment ratio information for the target object line items; column 812 may include the value that was allocated based on the assignment ratios; column 814 may include the original cost for the heritage object line item (rather than the cost of the source object line item).

In at least one of the various embodiments, in this example, row 816 may be assignment ratio data that may be employed to determine that server S1 contributes $70 to the costs of W1, where, the product of the line 816 column 808 and line 816 column 810 and line 816 column 814 produces $70.

To further clarify using assignment ratio table row 816 of this example, the value in column HI 804 ("S1") represents the S1 line item from server object 706 (the heritage object in this example). Likewise, the value in column Source 806 (SEA) represents the SEA line item from location object 710 (the source object in this example); the value in column HIRV 808 represents the assignment ratio value for allocating costs from S1 in server object 706 to line item. SEA in location object 710. Here, HIRV may be determined from the assignment ratio table in Servers-to-Location allocation rule 708 where it defines that all of S1 costs are allocated to SEA ($140); column RV 810 in row 816 defines how costs from source object line item SEA are allocated to product W1. In this example, the RV is the same as it was defined in allocation rule 712 of FIG. 7. Continuing with this example, Cost 812 of row 816 is computed by multiplying the HIRV and the RV and the value of column HI Src 814. Here, HR Src is the original costs for S1 that is brought in from the location object 710 (the heritage object in this example). In short for each row in the assignment ratio table of allocation rule 800, Cost=HIRV*RV*HI Src. For row 816 this Cost is computed as $70=1*0.5*$140. Likewise, for row 818 the value for Cost (row 818 at column 812) is computer as $0=0*0.5*$140. The remaining rows in the assignment ratio table for allocation rule 800 may be computed similarly—though the values may changed based on the underlying heritage information.

In this example, including the heritage information associated with location object 710 does not change to total value of costs allocation to W1, it remains $160. But it enables the data model to clearly illustrate that $70 of the total costs of W1 is coming from S1. This result would be obscured absent the heritage information being applied to model.

One of ordinary skill in the art will appreciate that allocation rule 800 is a non-limiting example, and that real-life data models may include arbitrarily complex allocation rules that may include arbitrarily complex formulas for generating assignment ratio tables and mapping costs and/or values between model objects. However, allocation rule 800 as illustrated in herein are sufficient to at least describe, enable, and disclose at least the innovations contained in this application.

Generalized Operations

Figure 9:
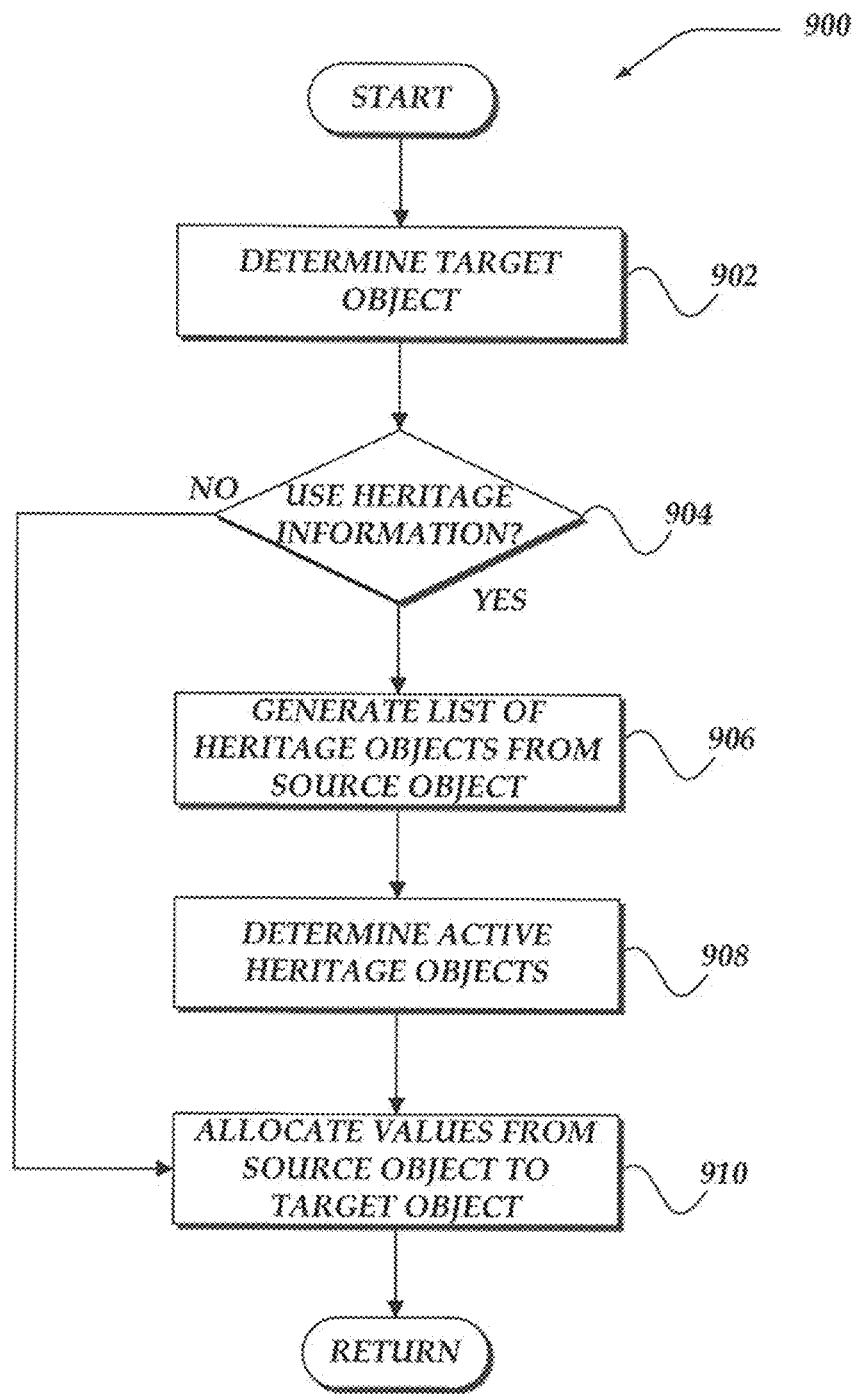
FIG. 9 illustrates a flowchart for a process for allocating costs in data model in accordance with at least one of the various embodiments.
Figure 10:
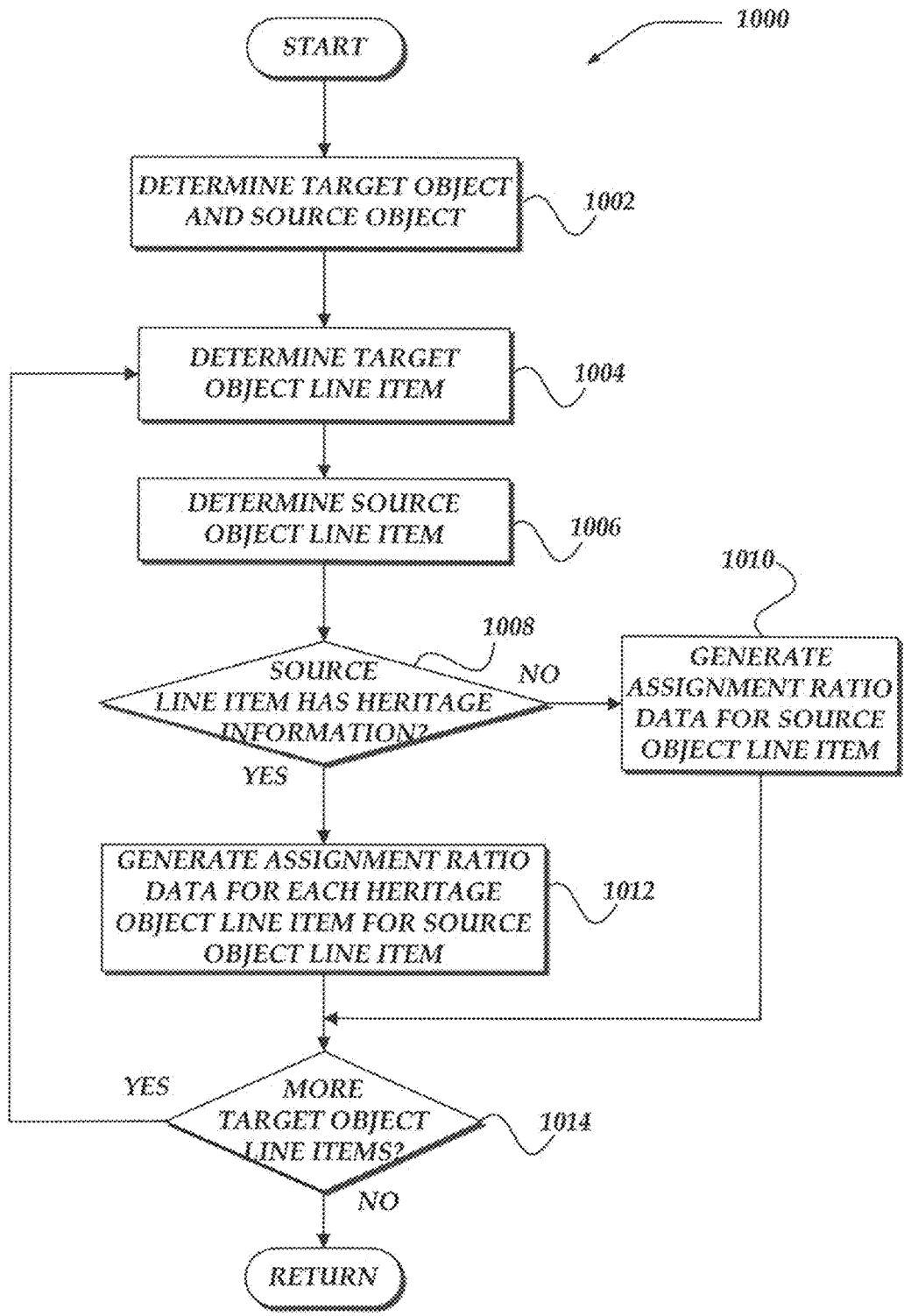
FIG. 10 illustrates a flowchart for a process for allocating costs in data model using heritage information in accordance with at least one of the various embodiments.

FIGS. 9-10 represent the generalized operations of allocating heritage information in data models in accordance with at least one of the various embodiments. In at least one of the various embodiments, processes 900, and 1000 described in conjunction with FIGS. 9-10 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 9-10 may be operative in budget and forecasting architectures such as those described in conjunction with FIGS. 4-8.

FIG. 9 illustrates a flowchart for process 900 for allocating costs in data model in accordance with at least one of the various embodiments. After a start block, at block 902, in at least one of the various embodiments, a target object in the data model may be determined. In at least one of the various embodiments, the target object may be selected from among existing objects. In other cases, the target object may be selected at the time it is being generated. In at least one of the various embodiments, the particular selected target object may be determined based on policy based rules, configuration values, or the like, some of which may comprise a business system template. Also, in at least one of the various embodiments, the target object may be automatically determined if it is the latest and/or newest object added to the model in other embodiments, the target object may be determined based on direct user input. Similarly, in at least one of the various embodiments, a source object may be selected and/or determined. In at least one of the various embodiments, source objects may be data objects mat contribute costs to the target object.

At decision block 904, in at least one of the various embodiments, if heritage information is being used for fee current allocation rule, control may flow to block 906. Otherwise, in at least one of the various embodiments, control may flow block 910.

In at least one of the various embodiments, determining if heritage information may be used for a particular target object may be based on policy based rules, configuration values, or the like, some of which may comprise a business system template. Also, in at least one of the various embodiments, the use of heritage information may be determined based on direct user input.

At block 906, in at least one of the various embodiments, a list of heritage objects and/or heritage object line items may be determined from the source object. In at least one of the various embodiments, there may be one or more objects in the model that may be able to provide heritage information for a source object. In at least one of the various embodiments, objects below a source object may be indicated as having the potential to provide heritage information. In at least one of the various embodiments, objects that allocate costs to the source object may be eligible for providing heritage information for allocation rules that allocate values from the source object to the target object. In at least one of the various embodiments, heritage objects may include one or more heritage object line items that may allocate values to a source object line item.

At block 908, in at least one of the various embodiments, one or more active heritage objects may be determined. One or more objects in the model may be determined to be eligible heritage objects. However, in at least one of the various embodiments, even though an object may be eligible to provide heritage information, it may be omitted from the set of active heritage objects.

In at least one of the various embodiments, active heritage objects may be determined based on filters, policy based rules, configuration values, or the like, some of which may comprise a business system template. Also, in at least one of the various embodiments, the selection of active heritage objects may be determined based on direct user input. In at least one of the various embodiments, a list of potential heritage objects that may be associated with the source object. The list of potential heritage objects may include one or more data objects (potential heritage objects) located in the data model below the source object. For example, in at least one of the various embodiments, a user may click a user-interface button that may cause the display of selection list that may be populated with the eligible data objects.

In at least one of the various embodiments, since heritage objects may comprise one or more line items, the set of heritage object line items used for providing heritage information may be selected from among them. In at least one of the various embodiments, some or all of the heritage object line items may be selected using filters, policy based rules, configuration values, or the like.

Likewise, in at least one of the various embodiments, if a heritage object comprises more than one column, the one or more columns from the heritage object may be selectively determined to provide heritage information to the source object. In at least one of the various embodiments, the determination of heritage object line items used to provide heritage information may be based on filters, policy based rules, configuration values, or the like, some of which may comprise a business system template. Also, in at least one of the various embodiments, the selection of active heritage lines may be determined based on direct user input (e.g., a select list as described above).

At block 910, in at least one of the various embodiments, the values from the source object may be allocated to the target object based on an allocation rule between the source object and the target object. In at least one of the various embodiments. If an allocation rule that allocates values from the source object to the target object is configured to include heritage information, the assignment ratio data from data objects that are below the source object (e.g., objects in the model that allocate value to the source object) may be made available for generating reports and analysis relating to the target object. In at least one of the various embodiments, a final cost value for the target object may be generated based on a sum of each generated target object line item such that the final cost value may be included in the model and/or displayable in the model.

In at least one of the various embodiments, heritage objects further removed from the source object may be selected and/or determined such that there may be other data objects intervening between the source object and the determined heritage object. In at least one of the various embodiments, in this case, heritage information from the heritage object may be chained by propagating the heritage information to each intervening data object between the source object and the determined heritage object. In at least one of the various embodiments, the heritage information may be propagated to each chained data object by repeating the method described in FIG. 10 for each intervening data object. For example, in at least one of the various embodiments, using FIG. 7 for this example, if product object 714 is the target object and location object 710 is the source object and GL object 702 is the heritage object, heritage information from GL object 702 may be computed for server object 706, wherein the result may be used to compute the heritage information for location object 710 which may be subsequently be included in the allocation rule and assignment ratio table for product object 710. Next, in at least one of the various embodiments, control may be returned to a calling process.

FIG. 10 illustrates a flowchart for process 1000 for allocating costs in data model using heritage information in accordance with at least one of the various embodiments. After a start block, at block 1002, in at least one of the various embodiments, the target object and source object may be determined. In at least one of the various embodiments, the source object and target object may be provided to process 1000 by another process such as process 900.

Further, in at least one of the various embodiments, identifiers and/or references to the source object and target object sufficient for locating and if necessary retrieving the data of the source object and target may be provided. In some embodiments, each objector of portion of each object may be provided directly to process 1000.

In at least one of the various embodiments, the target object and the source object may be determined based on the data model.

At block 1004, in at least one of the various embodiments, a set of line items in the target object may be determined. In at least one of the various embodiments, the target object may include one or more line items. For example, Product object 714, in FIG. 7, is an example of a target object that includes two line items, W1 and W2. In the FIG. 7 example, W1 and W2 may represent two products that are produced by a business system.

In at least one of the various embodiments, each determined target object line item may be iterated over and processed individually. Further, in at least one of the various embodiments, one or more lines items may be processed in parallel and/or concurrently.

In some embodiments, the allocation rule that is operative between the source object and the target object may include instruction that determine which of the line items in the target object may be used. This determination may be based on filters that may be included as part of the allocation rule. In at least one of the various embodiments, the filters may be employed to select and/or exclude line items based on matching rules (e.g., regular expressions), lists, value thresholds (e.g., exclude line items having values of less than a defined value), or the like, or combination thereof.

At block 1006, in at least one of the various embodiments, a set of line items in the source object may be determined. In at least one of the various embodiments, the source object may include one or more line items. For example, Location object 710, in FIG. 7, is an example of an object that has two line items (SEA and CHI). In the FIG. 7 example, SEA and CHI may represent two locations, such as, data centers, that are part of a modeled business system. In at least one of the various embodiments, each determined line item may be iterated over and processed individually. Further, in at least one of the various embodiments, one or more source object line items may be processed in parallel and/or concurrently.

In at least one of the various embodiments, it may not be necessary to iterate over each line item in the source object. In some embodiments, the allocation rule that is in effect between the source object and the target object may include instructions that determine which of the line items in the source object are used. In at least one of the various embodiments, filters may be employed to determine which source object line items to include by selecting and/or excluding line items based on matching rules (e.g., regular expressions), lists, value thresholds (e.g., exclude line items having values of less than a defined value), or the like, or combination thereof.

In at least one of the various embodiments, the allocation rule may include instructions for determining if a source object line item may be employed to provide heritage information. These instructions may be filter based, or, in at least one of the various embodiments, direct user intervention may be used to select the source object line item. In any case, the allocation rule may include instructions that can be employed to determine if a particular source object line item should use heritage information and, if so, what information to use. In at least one of the various embodiments, a filter may be defined such that it excludes some heritage object line items from being provided to the source object. Filters may be employed to determine which heritage object line items to include by selecting and/or excluding line items based on matching rules (e.g., regular expressions), lists, value thresholds (e.g., exclude line items having values of less than a defined value), or the like, or combination thereof For example, in at least one of the various embodiments, if product object 714 is the target object and location object 710 is the source object, a filter that excluded heritage assignment ratio data related to the source object line item of SEA from location object 710 would result in an allocation rule that may be similar to allocation rule 800 in FIG. 8, except all of the lines in the assignment ratio table having Source (column 806) matching SEA would be absent, such as row 816.

At decision block 1008, in at least one of the various embodiments, if the source object line item is associated with heritage information, control may flow to block 1012. Otherwise, in at least one of the various embodiments, control may flow to block 1010.

At block 1010, in at least one of the various embodiments, assignment ratio data for the source object line item may be generated. In at least one of the various embodiments, if, based on the allocation rule, heritage information is not indicated for the current source object line item, the source item may be processed normally. Thus, in at least one of the various embodiments, assignment ratio data for the source object to the target object (absent heritage information) may be generated and applied to the model.

At block 1012, in at least one of the various embodiments, assignment ratio data for each heritage object line item for the source item may be generated. In at least one of the various embodiments, there may be one or more heritage object line items that may be associated with single source object line item. In some embodiments, assignment ratio data for each heritage object line item may be generated and included the allocation rule for the source object.

In at least one of the various embodiments, the assignment ratio data associated with a heritage object line item may include the cost value from the heritage object and the assignment ratio value from the heritage object line item. In at least one of the various embodiments, this assignment ratio data may include assignment ratio data defining the allocation of one or more costs from the heritage object to the source object. The assignment ratio data may be carried forward from the heritage object line item so it may be combined with the assignment ratio data from the source object to the target object. (See, FIG. 8). Accordingly, in at least one of the various embodiments, determining a target object assignment ratio based on a combination of the source object assignment ratio data and the assignment ratio data from the at least one heritage object line item In at least one of the various embodiments, generating assignment ratio data for each heritage object line item for each source object line item may generate additional records in an assignment ratio table for an allocation rule. However, these additional records may enable the data model to be employed to generate reports on how heritage information may be related to the target object and/or target object line items. In at least one of the various embodiments, a portion of a cost of the generated target object line item that is contributed from one or more heritage object line items may be displayed. Further, in at least one of the various embodiments, a final cost value for the target object may be generated based on a sum of each generated target object line item such that the final cost value may be included in the model and/or displayable in the model.

At decision block 1014, in at least one of the various embodiments, if there are more target object line items in the target object, control may loop back block 1004. Otherwise, in at least one of the various embodiments, control may be returned a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Furthermore, in at least one of the various embodiments, the actions specified in one or more blocks may be performed concurrently if appropriate and/or if enabled by the underlying hardware and computer processor.

What is claimed as new and desired to be protected by Letters Patent of the United States is:

1. A method for allocating costs for a plurality of cost objects employing a network computer, wherein one or more processors in the network computer performs actions, comprising:
    employing a budgeting and forecasting application to rapidly perform actions, including:
        providing, by the one or more processors, a target object, a source object, and a heritage object from a data model, wherein the heritage object is associated with the source object, and wherein the data model is created based on a logical architecture that includes categories for general ledger information, server information, support information and business unit information;
        providing, by the one or more processors, one or more heritage object line items from the heritage object based on a value threshold, wherein the one or more heritage object line items have a value that exceeds the value threshold;
        providing, by the one or more processors, an allocation rule from the source object to the target object that produces assignment rations that correspond to the one or more object to the target object that produces assignment ratios that correspond to the one or more heritage object line items, wherein the execution of the allocation rule enables the data model to expose at least one detail that is obscured by at least one intervening object in the data model;
        providing, by the one or more processors, an assignment ratio table that is configured and arranged by executing the allocation rule to include:
            an identity of one or more target object line items;
            an identity of the one or more heritage object line items;
            an identity of one or more source object line items;
            assignment ratio data of the one or more heritage object line items; and assignment ratio data of the one or more target object line items; and
        wherein the assignment ratio table is stored in a non-transitory computer readable media of the network computer; and
    employing an allocation application to rapidly perform actions, comprising:
        providing, by the one or more processors, the one or more source object line items of the source object based in part on allocating costs from the heritage object by executing the allocation rule, wherein the one or more source object line items are associated with heritage object assignment ratio data provided by the execution of another allocation rule that is associated with the one or more heritage object line items, and wherein the heritage object assignment ratio data and the identity of the one or more heritage object line items is store in the assignment ratio table;
        providing, by the one or more processors, the one or more target object line items in the target object based in part on allocating costs from the source object based on the allocation rule, wherein the costs allocated to the one or more target object line items are based on the one or more source object line items and the execution of the allocation rule, wherein each of the target object line items are individually iterated over and each of the source object line items are processed in parallel or concurrently to rapidly determine the cost allocation for two or more object line items that are physically disposed at two or more remote locations;
        providing, by the one or more processors, assignment ratio data for the one or more target object line items based on a combination of the assignment ratio data associated with the one or more source object line items and the assignment ratio data associated with the one or more heritage object line items, wherein the assignment ratio data for the one or more target object line items, the identity of the one or more target object line items, and the identity of the one or more heritage object line items are stored in the assignment ratio table, and wherein the data model categories employ one or more allocation rules to identify allocation of resources in each category for assignment to the one or more target object line items; and providing, by the one or more processors, a final cost value for the target object based on a sum of each of the one or more target object line items in the data model, wherein the final cost value is communicated over a wired network or a wireless network and displayed with a separate hardware display, wherein one or more visualizations of reports are generated and rendered for displaying on the separate hardware display.

2. The method of claim 1, wherein allocating costs from the source object, further comprises, providing the target object assignment ratio based on a combination of the source object assignment ratio data and the heritage object assignment ratio data, wherein the source object assignment ratio data and the heritage object assignment ratio data is obtained from the assignment ratio table.

3. The method of claim 1, further comprising, displaying, by the one or more processors, a portion of a cost of the one or more target object line items that are contributed from the one or more heritage object line items.

4. The method of claim 1, further comprising:
providing, by the one or more processors, at least one other heritage object in the data model that is associated with the source object; and
propagating, by the one or more processors, at least heritage information that corresponds to the at least one other heritage object to one or more intervening data objects disposed between the source object and the provided other heritage object.

5. The method of claim 1, further comprising, displaying, by the one or more processors, a list of potential heritage objects that are associated with the source object, wherein the list of potential heritage objects includes one or more data objects located in the data model that allocates one or more values to the source object.

6. The method of claim 1, wherein providing one or more target object line items, further comprises, computing a cost allocated to the one or more target object line items based on a combination of a heritage information ratio value and a source object line item ratio value, wherein the heritage information ratio value corresponds to the provided source object line item.

7. The method of claim 1, further comprising, employing, by the one or more processors, a filter to that selects the one or more source object line items.

8. The method of claim 1, wherein providing the one or more source object line items, further comprise, employing a filter that selects the assignment ratio data from the one or more heritage object line items.

9. A network computer for allocating costs for a plurality of cost objects, comprising:
a transceiver for communicating over the network;
a memory for storing at least instructions;
one or more processor devices that execute instructions stored in the memory to perform actions, including:
employing a budgeting and forecasting application to rapidly perform actions, including:
providing, by the one or more processors, a target object, a source object, and heritage object from a data model, wherein the heritage object is associated with the source object, and wherein the data model is created based on logical architecture that includes categories for general ledge information, server information, support information and business unit information;
providing, by the one or more processors, a target object, a source object, and a heritage object from a data model, wherein the heritage object is associated with the source object, and wherein the data model is created based on a logical architecture that includes categories for general ledger information, server information, support information and business unit information;
providing, by the one or more processors, one or more heritage object line items from the heritage object based on a value threshold, wherein the one or more heritage object line items have a value that exceeds the value threshold;
providing, by the one or more processors, an allocation rule from the source object to the target object that produces assignment ratios that correspond to the one or more heritage object line items, wherein the execution of the allocation rule enable the data model to expose at least one detail that is obscured by at least one intervening object in the data model;
providing, by the one or more processors, an assignment ratio table that is configured and arranged by executing the allocation rule to include:
an identity of one or more target object line items;
an identity of the one or more heritage object line items;
an identity of one or more source object line items;
assignment ratio data of the one or more heritage object line items; and assignment ratio data of the one or more target object line items; and
wherein the assignment ratio table is stored in a non-transitory computer readable media of the network computer; and
employing an allocation application to rapidly perform actions, comprising:
providing, by the one or more processors, the one or more source object line items of the source object based in part on allocating costs from the heritage object by executing the allocation rule, wherein the one or more source object line items are associated with heritage object assignment ratio data provided by the execution of another allocation rule that is associated with the one or more heritage object line items, and wherein the heritage object assignment ratio data and the identity of the one or more heritage object line items is stored in the assignment ratio table;
providing, by the one or more processors, the one or more target object line items in the target object based in part on allocating costs from the source object based on the allocation rule, wherein the costs allocated to the one or more target object line items are based on the one or more source object line items and the execution of the allocation rule, wherein each of the target object line items are individually iterated over and each of the source object line items are processed in parallel or concurrently to rapidly determine the cost allocation for two or more object line items that are physically disposed at two or more remote locations; providing, by the one or more processors, assignment ratio data for the one or more target object line items based on a combination of the assignment ratio data associated with the one or more source object line items and the assignment ratio data associated with the one or more heritage object line items, wherein the assignment ratio data for the one or more target object line items, the identity of the one or more target object line items, and the identity of the one or more heritage object line items are stored in the assignment ratio table, and wherein the data model categories employ one or more allocation rules to identify allocation of resources in each category for assignment to the one or more target object line items; and providing, by the one or more processors, a final cost value for the target object based on a sum of each of the one or more target object line items in the data model, wherein the final cost value is communicated over a wired network or a wireless network and displayed with a separate hardware display, wherein one or more visualizations of reports are generated and rendered for displaying on the separate hardware display.

10. The network computer of claim 9, wherein allocating costs from the source object, further comprises, providing the target object assignment ratio data based on a combination of the source object assignment ratio data and the heritage object assignment ratio data, wherein the source object assignment ratio data and the heritage object assignment ratio data is obtained from the assignment ratio table.

11. The network computer of claim 9, wherein the one or more processor devices perform actions, further comprising, displaying a portion of a cost of the one or more target object line items that are contributed from the one or more heritage object line items.

12. The network computer of claim 9, wherein the one or more processor devices perform actions, further comprising:
providing at least one other heritage object in the data model that is associated with the source object; and
propagating at least heritage information that corresponds to the at least one other heritage object to one or more intervening data objects disposed between the source object and the provided other heritage object.

13. The network computer of claim 9, wherein the one or more processor devices perform actions, further comprising, displaying a list of potential heritage objects that are associated with the source object, wherein the list of potential heritage objects includes one or more data objects located in the data model that allocate one or more values to the source object.

14. The network computer of claim 9, wherein providing at least one line item in the target object, further comprises, computing a cost allocated to the one or more target object line item based on a combination of a heritage information ratio value and a source object line item ratio value, wherein the heritage information ratio value corresponds to the provided source object line item.

15. The network computer of claim 9, wherein the one or more processor devices perform actions, further comprising, employing that selects the one or more source object line items.

16. The network computer of claim 9, wherein providing the one or more source object line items, further comprise, employing a filter that selects the assignment ratio data from the one or more heritage object line items.

17. A processor readable non-transitory storage media that includes instructions for allocating costs for a plurality of cost object, wherein one or more processors in a network computer execute at least a portion of the instructions to perform actions, comprising:
employing a budgeting and forecasting application to rapidly perform actions, including:
providing, by the one or more processors, a target object, a source object, and a heritage object from a data model, wherein the heritage object is associated with the source object, and wherein the data model is created based on a logical architecture that includes categories for general ledger information, server information, support information and business unit information;
providing, by the one or more processors, one or more heritage object line items from the heritage object based on a value threshold, wherein the one or more heritage object line items have a value that exceeds the value threshold;
providing, by the one or more processors, an allocation rule from the source object to the target object that produces assignment ratios that correspond to the one or more heritage object line items, wherein the execution of the allocation rule enables the data model to expose at least one detail that is obscured by at least one intervening object in the data model;
providing, by the one or more processors, an assignment ration table that is configured and arranged by executing the allocation rule to include:
an identity of one or more target object line items;
an identity of the one or more heritage object line items;
an identity of one or more source object line items;
assignment ratio data of the one or more heritage object line items; and assignment ratio data of the one or more target object line items; and
wherein the assignment ratio table is stored in a non-transitory computer readable media of the network computer; and
employing an allocation application to rapidly perform actions, comprising:
providing, by the one or more processors, the one or more source object line items of the source object based in part on allocating costs from the heritage object by executing the allocation rule, wherein the one or more source object line items are associated with heritage object assignment ratio data provided by the execution of another allocation rule that is associate with the one or more heritage object line items, and wherein the heritage object assignment ratio data and the identity of the one or more heritage object line items is stored in the assignment ratio table;
providing, by the one or more processors, the one or more target object line items in the target object based in part on allocating costs from the source object based on the allocation rule, wherein the costs allocated to the one or more target object line items are based on the one or more source object line items and the execution of the allocation rule, wherein each of the target object line items are individually iterated over and each of the source object line items are processed in parallel or concurrently to rapidly determine the cost allocation for two or more object line items that are physically disposed at two or more remote locations;
providing, by the one or more processors, assignment ratio data for the one or more target object line items based on a combination of the assignment ratio data associated with the one or more source object line items and the assignment ratio data associated with the one or more heritage object line items, wherein the assignment ratio data for the one or more target object line items, the identity of the one or more target object line items, and the identity of the one or more heritage object line items are stored in the assignment ratio table, and wherein the data model categories employ one or more allocation rules to identify allocation of resources in each category for assignment to the one or more target object line items; and providing, by the one or more processors, a final cost value for the target object based on a sum of each of the one or more target object line items in the data model, wherein the final cost value is communicated over a wired network or a wireless network and displayed with a separate hardware display, wherein one or more visualizations of reports are generated and rendered for displaying on the separate hardware display.

18. The media of claim 17, wherein allocating costs from the source object, further comprises, providing the target object assignment ratio data based on a combination of the source object assignment ratio data and the heritage object assignment ratio data, wherein the source object assignment ratio data and the heritage object assignment ratio data is obtained from the assignment unit ratio table.

19. The media of claim 17, further comprising, displaying a portion of a cost of the one or more target object line items that are contributed from the one or more heritage object line items.

20. The media of claim 17, further comprising:
providing at least one other heritage object in the data model that is associated with the source object; and
propagating at least heritage information that corresponds to the at least one other heritage object to one or more intervening data objects disposed between the source object and the provided other heritage object.

21. The media of claim 17, further comprising, displaying a list of potential heritage objects that are associated with the source object, wherein the list of potential heritage objects includes one or more data objects located in the data model that allocate one or more values to the source object.

22. The media of claim 17, wherein providing one or more target object line items, further comprises, computing a cost allocated to the one or more target object line items based on a combination of a heritage information ratio value and a source object line item ratio value, wherein the heritage information ratio value corresponds to the provided source object line item.

23. The media of claim 17, further comprising, employing a filter to that selects the one or more source object line items.

24. A system for allocating costs for a plurality of cost objects, comprising:
a network computer, including:
a transceiver for communicating over the network;
a memory for storing at least instructions;
one or more processor devices that execute instructions stored in the memory to perform actions, including:
employing a budgeting and forecasting application to rapidly perform actions, including:
providing, by the one or more processors, a target object, a source object, and a heritage object from a data model, wherein the heritage object is associated with the source object, and wherein the data model is created based on a logical architecture that includes categories for general ledger information, server information, support information and business unit information;
providing, by the one or more processors, one or ore heritage object line items from the heritage object based on a value threshold, wherein the one or more heritage object line items have a value that exceeds the value threshold;
providing, by the one or more processors, an allocation rule from the source object to the target object that produces assignment ratios that correspond to the one or more heritage object line items, wherein the execution of the allocation rule enables the data model to expose at least one detail that is obscured by at least one intervening object in the data model;
providing, by the one or more processors, an assignment ratio table that is configured and arranged by executing the allocation rule to include:
an identity of one or more target object line items;
an identity of the one or more heritage object line items;
an identity of one or more source object line items;
assignment ratio data of the one or more heritage object line items; and assignment ratio data of the one or more target object line items; and
wherein the assignment ratio table is stored in a non-transitory computer readable media of the network computer; and
employing an allocation application to rapidly perform actions, comprising:
providing, by the one or more processors, the one or more source object line items of the source object based in part on allocating costs from the heritage object by executing the allocation rule, wherein the one or more source object line items are associated with heritage object assignment ratio data provided by the execution of another allocation rule that is associated with the one or more heritage object line items, and wherein the heritage object assignment ratio data and the identity of the one or more heritage object line items is stored in the assignment ratio table;
providing, by the one or more processors, the one or more target object line items in the target object based in part on allocating costs from the source object based on the allocation rule, wherein the costs allocated to the one or more target object line items are based on the one or more source object line items and the execution of the allocation rule, wherein each of the target object line items are individually iterated over and each of the source object line items are processed in parallel or concurrently to rapidly determine the cost allocation for two or more object line items that are physically disposed at two or more remote locations;
providing, by the one or more processors, assignment ratio data for the one or more target object line items based on a combination of the assignment ratio data associated with the one or more source object line items and the assignment ratio data associated with the one or more heritage object line items, wherein the assignment ratio data for the one or more target object line items, the identity of the one or more target object line items, and the identity of the one or more heritage object line items are stored in the assignment ratio table, and wherein the data model categories employ one or more allocation rules to identify allocation of resources in each category for assignment to the one or more target object line items; and providing, by the one or more processors, a final cost value for the target object based on a sum of each of the one or more target object line items in the data model, wherein the final cost value is communicated over a wired network or a wireless network and displayed with a separate hardware display; and a client network computer, including:
  a transceiver for communicating over the network;
  a memory for storing at least instructions;
  one or more processor devices that execute instructions stored in the memory to perform actions, including
    providing information to the network computer for generating the data model; and
    displaying at least one report related to the data model that is communicated over a wired network or a wireless network from the network computer, wherein one or more visualizations of the at least one report is generated and rendered for displaying on the separate hardware display.

25. The system of claim 24, wherein allocating costs from the source object, further comprises, providing the target object assignment ratio data based on a combination of the source object assignment ratio data and the heritage object assignment ratio data, wherein the source object assignment ratio data and the heritage object assignment ratio data is obtained from the assignment ratio table.

26. The system of claim 24, wherein the one or more processor devices of the network computer execute instructions that perform actions, further comprising, displaying, by the one or more processors, a portion of a cost of the one or more target object line items that are contributed from the one or more heritage object line items.

27. The system of claim 24, wherein the one or more processor devices of the network computer execute instructions that perform actions, further comprising:
  providing at least one other heritage object in the data model that is associated with the source object; and
  propagating at least heritage information that corresponds to the at least one other heritage object to one or more intervening data objects disposed between the source object and the provided other heritage object.

28. The system of claim 24, wherein the one or more processor devices of the network computer execute instructions that perform actions, further comprising, displaying a list of potential heritage objects that are associated with the source object, wherein the list of potential heritage objects includes one or more data objects located in the data model that allocate one or more values to the source object.

29. The system of claim 24, wherein providing one or more target object line items, further comprises, computing a cost allocated to the one or more target object line items based on a combination of a heritage information ratio value and a source object line item ratio value, wherein the heritage information ratio value corresponds to the provided source object line item.

30. The system of claim 24, wherein providing the one or more source object line items, further comprise, employing a filter that selects the assignment ratio data from the one or more heritage object line items.

* * * * *